US010983236B2

(12) United States Patent
Ma et al.

(10) Patent No.: US 10,983,236 B2
(45) Date of Patent: Apr. 20, 2021

(54) SUPER-RESOLUTION RADON TRANSFORM BASED ON THRESHOLDING

(71) Applicant: Saudi Arabian Oil Company, Dhahran (SA)

(72) Inventors: Yue Ma, Beijing (CN); Yi Luo, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 344 days.

(21) Appl. No.: 16/005,807

(22) Filed: Jun. 12, 2018

(65) Prior Publication Data
US 2018/0364383 A1  Dec. 20, 2018

Related U.S. Application Data

(60) Provisional application No. 62/522,525, filed on Jun. 20, 2017.

(51) Int. Cl.
*G01V 1/36* (2006.01)
*G06T 5/00* (2006.01)
(Continued)

(52) U.S. Cl.
CPC ............ *G01V 1/364* (2013.01); *G01V 1/28* (2013.01); *G06T 5/002* (2013.01); *G06T 5/10* (2013.01);
(Continued)

(58) Field of Classification Search
CPC . G01V 1/28; G01V 1/32; G01V 1/364; G01V 2210/23; G01V 2210/244;
(Continued)

(56) References Cited

U.S. PATENT DOCUMENTS 754,622 A      3/1904  Thompson
6,574,567 B2 *  6/2003  Martinez ............... G01V 1/36
                                                         702/17
(Continued)

FOREIGN PATENT DOCUMENTS

CN      102879824      3/2015
EP       2639600       9/2013
(Continued)

OTHER PUBLICATIONS

Bao et al., "Extrapolated Proximal Iterative Hard Thresholding Methods for Wavelet Frame Base Image Restoration," May 14, 2015, 28 pages.
(Continued)

*Primary Examiner* — Elias Desta
(74) *Attorney, Agent, or Firm* — Fish & Richardson P.C.

(57) ABSTRACT

Post-stack seismic data is received. Transformed seismic data is created from the received post-stack seismic data, including performing a super-resolution radon transform on the post-stack seismic data. Signal and noise regions are separated using the transformed seismic data, including using a defined muting function to remove unwanted noise. An inverse radon transform is performed using the separated signal and noise regions, outputting only signals.

12 Claims, 13 Drawing Sheets
(7 of 13 Drawing Sheet(s) Filed in Color)

(51) Int. Cl.
*G01V 1/28* (2006.01)
*G06T 5/10* (2006.01)
*G01V 1/32* (2006.01)

(52) U.S. Cl.
CPC ............ *G01V 1/32* (2013.01); *G01V 2210/23* (2013.01); *G01V 2210/244* (2013.01); *G01V 2210/46* (2013.01); *G06T 2207/20048* (2013.01); *G06T 2207/20064* (2013.01); *G06T 2207/20182* (2013.01)

(58) Field of Classification Search
CPC ...... G01V 2210/46; G06T 2207/20048; G06T 2207/20064; G06T 2207/20182; G06T 5/002; G06T 5/10
See application file for complete search history.

(56) References Cited

U.S. PATENT DOCUMENTS

| | | | |
|---|---|---|---|
| 6,636,810 | B1 | 10/2003 | Moore et al. |
| 8,237,138 | B2 | 8/2012 | Nisper et al. |
| 9,058,654 | B2 | 6/2015 | Pescatore et al. |
| 9,607,362 | B2 | 3/2017 | Baron et al. |
| 9,904,986 | B2 | 2/2018 | Zhu et al. |
| 2013/0238248 | A1 | 9/2013 | Aeron et al. |
| 2016/0116620 | A1 | 4/2016 | Sassen |
| 2017/0248716 | A1* | 8/2017 | Poole ...................... G01V 1/28 |

FOREIGN PATENT DOCUMENTS

| | | |
|---|---|---|
| WO | 2014162300 | 10/2014 |
| WO | 2016075550 | 5/2016 |

OTHER PUBLICATIONS

International Search Report and Written Opinion issued in International Application No. PCT/US2018/037237 dated Sep. 25, 2018, 16 pages.
Gulf Cooperation Council Examination Report issued in GCC Application No. GC 2018-35503 dated Dec. 11, 2019, 4 pages.
Barzilai and Borwein, "Two-point step size gradient methods," IMA Journal of Numerical Analysis, vol. 8, Jan. 1, 1988, 8 pages.
Beck and Teboulle, "A fast iterative shrinkage-thresholding algorithm for linear inverse problems," SAIM, Journal of Imaging Science, vol. 2, May 26, 2009, presented at the ICASSP/IEEE International Conference on Acousticsm, Apr. 19-24, 2009, 20 pages.
Becker et al., "NESTA: A fast and accurate first-order method for sparse recovery," SIAM Journal of Imaging Science, vol. 4, Issue 1, Feb. 2011, 37 pages.
Beylkin, "Discrete radon transform," IEEE Transactions on Acoustics, Speech, and Signal Processing, vol. 35, No. 2, Feb. 1987, 11 pages.
Blumensath and Davies, "Iterative hard thresholding for compressed sensing," Applied Computer Harmonic Analysis, vol. 27, Issue 3, Nov. 2009, 10 pages.
Blumensath and Davies, "Iterative hard thresholding for sparse approximations," Journal of Fourier Analysis Application, vol. 14, Dec. 2008, 28 pages.
Blumensath and Davies, "Normalized iterative hard thresholding: Guaranteed stability and performance," Journal of Selected Topics Signal Processing, vol. 4, May 2010, 12 pages.
Candes and Fernandez-Granda, "Towards a mathematical theory of super-resolution," Communications on Pure and Applied Mathematics, Mar. 2012, 48 pages.
Daubechies et al., "An iterative thesholding algorithm for linear inverse problems with a sparsity constraint," Communications on Pure and Applied Mathematics, vol. 57, Issue 11, Nov. 2004, 45 pages.
Figueiredo and Norwak, "An EM algorithm for wavelet-based image restoration," IEEE Transactions on Image Processing, vol. 12, No. 8, Aug. 2003, 11 pages.
Hale and Zhang, "Fixed-point continuation for L1-minimization. Methodology and convergence," SIAM Journal Optimization, vol. 19, No. 3, Oct. 2008, 24 pages.
Hennefent et al., "New insights into one-norm solvers from the pareto curve," Geophysics vol. 73, Issue 4, Jul. 2008, 11 pages.
Liu and Sacchi, "De-multiple via a fast least squares hyperbolic radon transform," 72nd Annual International Meeting, SEG Expanded Abstracts, Oct. 6-11, 2002, 4 pages.
Lu, "An accelerated sparse time-invariant radon transform in the mixed frequency-time domain based on iterative 2d model shrinkage," Geophysics vol. 78, Issue 4, Jul.-Aug. 2013, 9 pages.
Needell and Tropp, "CoSaMP: Iterative signal recovery from incomplete and inaccurate samples," Commun. ACM, vol. 53, No. 12, Dec. 2010, 25 pages.
Ng and Perz, "High resolution radon transform in the t-x domain using intelligent prioritization of the gauss-seidel estimation sequence," 74th Annual International Meeting, SEG, Expanded Abstracts, Oct. 10-15, 2004, 4 pages.
Osborne et al., "A new approach to variable selection in least squares problems," IMA Journal of Numerical Analysis vol. 20, Issue 3, Jul. 1, 2000, 13 pages.
Sacchi and Ulrych, "High-resolution velocity gathers and offset space reconstruction," Geophysics vol. 60, No. 4, Jul.-Aug. 1995, 9 pages.
Scales et al., "Fast LP solution of large, spares, linear systems: Application to seismic travel time tomography," Journal of Computational Physics, vol. 75, Issue 2, Apr. 1988, 20 pages.
Thorson and Claerbout, "Velocity-stack and slant-stack stochastic inversion," Geophysics vol. 50, No. 12, Dec. 1985, 15 pages.
Trad et al., "Latest views of the sparse radon transform," Geophysics, vol. 68, No. 1, Jan.-Feb. 2003, 14 pages.
Tropp, "Greed is good: Algorithmic results for sparse approximation," IEEE Trans Inform Theory, vol. 50, No. 10, Oct. 2004, 12 pages.
Wang and Perz, "Seismic data interpolation by greedy local radon transform," Geophysics vol. 75, Issue 6, Nov.-Dec. 2010, 10 pages.
Wen et al., "A fast algorithm for sparse reconstruction based on shrinkage, subspace optimization, and continuation," SIAM Journal of Science Compt. vol. 32, Issue 4, Jun. 2010, 26 pages.
Yang and Zhang, "Alternating direction algorithms for L1-problems in compressive sensing," SIAM Journal of Science Comput. vol. 33, Issue 1, Feb. 2011, 26 pages.
Communication Pursuant to Article 94 (3) EPC issued in European Application No. 18738058.9 dated Sep. 30, 2020, 9 pages.
GCC Examination Report in GCC Appln. No. GC 2018-35503, dated May 5, 2020, 4 pages.

* cited by examiner

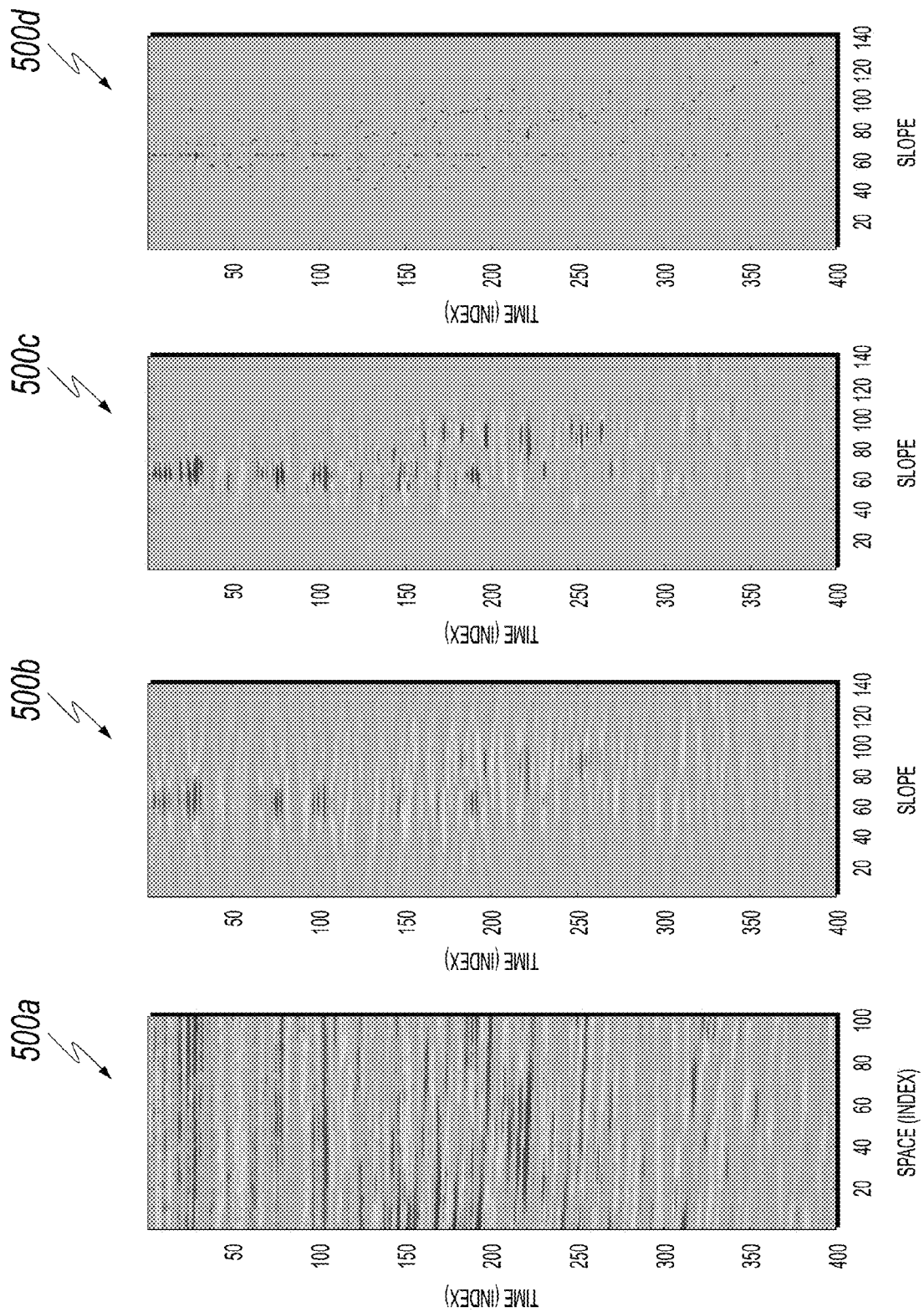

SUPER-RESOLUTION RADON TRANSFORM BASED ON THRESHOLDING

CROSS-REFERENCE TO RELATED APPLICATIONS

This application claims the benefit of priority to U.S. Provisional Application, Ser. No. 62/522,525, entitled "SUPER-RESOLUTION RADON TRANSFORM BASED ON THRESHOLDING", filed on Jun. 20, 2017, the entire contents of which is hereby incorporated by reference.

BACKGROUND

Radon-based transform algorithms have been widely used in seismic data processing, primarily for noise removal (surface waves and multiples). Basic assumptions include a sufficient dip or move-out difference between signal and noise. Additional sparseness criterion in the transform domain can be a useful constraint to minimize the overlapping of signal and noise. Theoretical studies based on compressive sensing principles can show that the dominant information in most signals is much sparse than the signal itself in an appropriate transform domain. Under the sparse assumption, signals can be reconstructed with overwhelming probability from far less data or measurements than what is usually considered necessary, such as according to Nyquist sampling theory. This means that seismic signals in time-space domain can be represented and reconstructed from a few non-zero samples in the transform domain. The sparse representation of data in the transform domain can offer opportunities to distinguish and suppress unwanted noise in an efficient manner.

SUMMARY

The present disclosure describes techniques for performing a super-resolution radon transform on seismic data.

In an implementation, post-stack seismic data is received. Transformed seismic data is created from the received post-stack seismic data, including performing a super-resolution radon transform on the post-stack seismic data. Signal and noise regions are separated using the transformed seismic data, including using a defined muting function to remove unwanted noise. An inverse radon transform is performed using the separated signal and noise regions, outputting only signals.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

The patent or application file contains at least one color drawing executed in color. Copies of this patent application publication with color drawings(s) will be provided by the Patent and Trademark Office upon request and payment of the necessary fee.

FIGS. 5A-5D collectively illustrate an example comparison of a standard, a high-resolution, and a super-resolution radon transform on a field data example, according to an implementation.

Like reference numbers and designations in the various drawings indicate like elements.

DETAILED DESCRIPTION

Figure 1A:
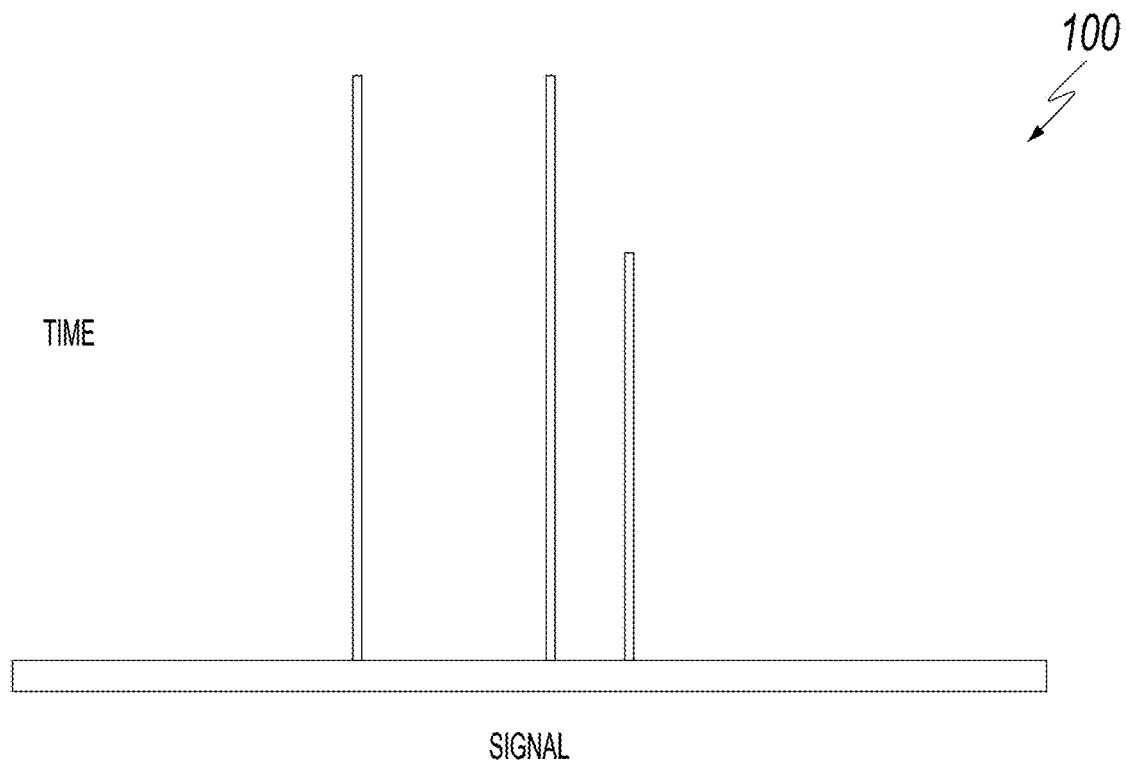
FIG. 1A is a graph illustrating an example super-resolution signal in a super-resolution problem in the spatial domain, according to an implementation.

The following detailed description describes systems, methods, and techniques for performing a super-resolution radon transform on seismic data, and is presented to enable any person skilled in the art to make and use the disclosed subject matter in the context of one or more particular implementations. For example, the described techniques are capable of removing more multiple contamination on seismic data than existing algorithms. The techniques increase vertical resolution, minimize noise, and allow for the identification of small structures and subtle stratigraphic changes in target horizons. Such details are crucial for prospect generation during exploration and effective well placement and geo-steering in developmental projects as well as reservoir characterization, among other possible applications.

In an example method, input to the method can include post-stack seismic data. Using that data, a super-resolution radon transform can be performed that decomposes a complex signal into a sum of simple spike-train signals. Once the seismic data is decomposed in the radon space by using the super-resolution radon transform, the signal and noise regions can be separated to the maximum extent. A muting function can be defined to remove some unwanted noise. The effectiveness of the signal/noise separation in the radon domain can rely on the resolution of the radon transform. Once the noise (or multiplies) has been removed, an inverse radon transform can be performed to output only signals (or primaries).

Various modifications, alterations, and permutations of the disclosed implementations can be made and will be readily apparent to those skilled in the art, and the general principles defined may be applied to other implementations and applications, without departing from scope of the disclosure. The present disclosure is not intended to be limited to the described or illustrated implementations, but to be accorded the widest scope consistent with the described principles and features.

When the radon transform is applied to the field data, it can suffer from the typical problem of low resolution that arise as a consequence of insufficient dip or move-out difference between signal and noise. Increasing the resolution of the radon transform is very important, because its main use is to map mixed and overlapping events in the seismic gather to a new transform domain where they can be separated. Then, after muting undesired components, the data are projected back to the original domain retaining only the desired information. Many different methods can be developed for obtaining the radon transform in the time-offset, frequency-offset, or frequency-wavenumber domain with linear, parabolic, or hyperbolic basis function. The most commonly used method is inversion. The standard radon transform can usually be associated with the minimization of a cost function that penalizes the model m and the misfit between observed and predicted data in a least-square sense, for example, as given by:

$$\min \mu \|m\|_2 + \frac{1}{2}\|d-Lm\|_2^2 \quad (1),$$

where d is the observed data, L is the inverse linear radon transform, and the parameter $\mu>0$ balances the trade-off between the data approximation and the model. The standard radon transform implementation fulfills the requirement of a fast transform, but does not allow proper handling of problems associated with limited aperture and discretization.

In order to achieve high-resolution radon transform, the inverse technique can be applied with a sparse constraint to the time domain radon transform. The direct representation of sparsity is to minimize the $\ell_0$ norm of the model m. The model m denotes the number of non-zero elements in the vector. However, the $\ell_0$ norm is not a convex function, so the local minimum is not unique. A common approach to obtain a sparse transform is to minimize the $\ell_1$ norm of the model and the $\ell_2$ norm of the data misfit:

$$\min \mu \|m\|_1 + \frac{1}{2}\|d-Lm\|_2^2 \quad (2).$$

Equation (2) can be solved by an iteratively re-weighted least squares (IRLS) algorithm, due to its simplicity and efficiency. Sparse radon transform algorithms can be implemented in the frequency domain, which is now generally used in seismic processing. Even though the sparse radon transform algorithms can be recognized as being superior to standard radon transform algorithms, sparse radon transform algorithms can bring new problems, including large computation times, the introduction of artifacts, and the difficulty to set up the inversion parameters. Some implementations can use a sparse time-invariant radon transform in the time-frequency domain based on iterative radon model shrinkage, with good performance and reduced computational time. All these sparse radon transform algorithms demonstrate that the resolution can be increased to some level by the use of sparseness criteria. However, the performance still needs to be improved on real data, because the limitation comes from the realization from $\ell_0$ norm to $\ell_1$ norm.

Some implementations can be based on a mathematical theory of super-resolution. Broadly speaking, the task can be cast as an inverse equation of recovering the original high-resolution image with fine details from coarse scale information, based upon reasonable assumptions or prior knowledge about the observation model.

FIG. 1A is a graph 100 illustrating an example super-resolution signal in a super-resolution problem in the spatial domain, according to an implementation. The graph 100 shows super-resolved spikes.

Figure 1B:
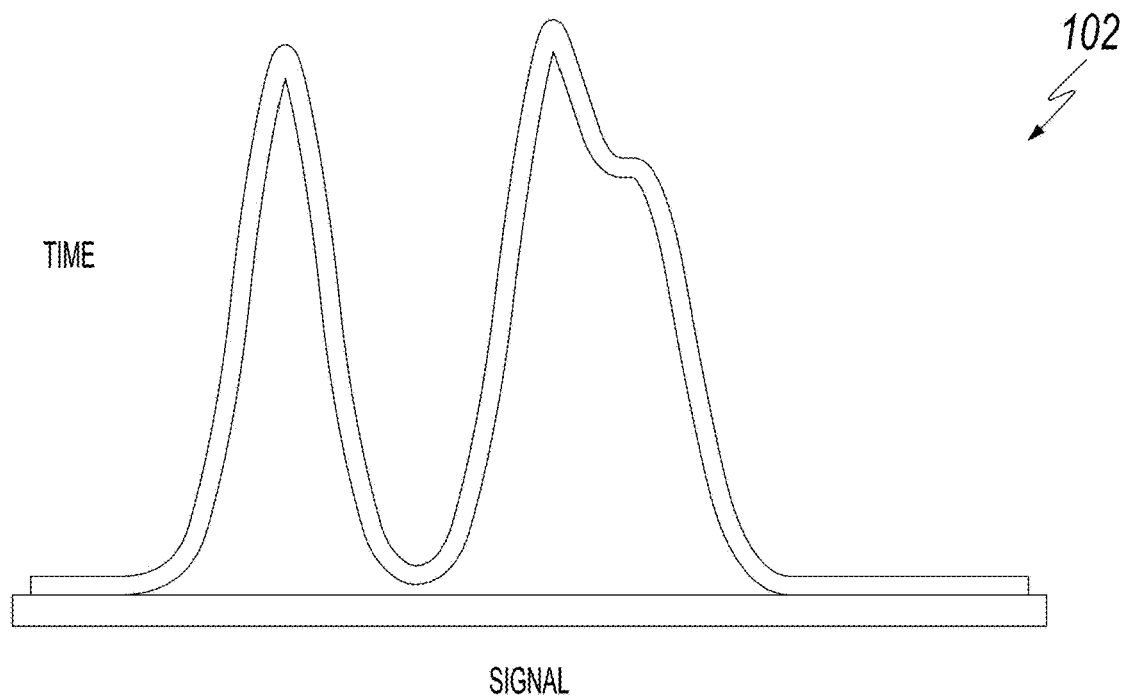
FIG. 1B is a graph illustrating an example high-resolution signal in the super-resolution problem in the spatial domain, according to an implementation.

FIG. 1B is a graph 102 illustrating an example high-resolution signal in the spatial domain, according to an implementation. The graph 102 is obtained by convolving the spikes (graph 100) with a low-frequency wavelet.

In order to get the super-resolution radon transform, a model that matches the data and has a sparsest representation can be used. This problem can be reformulated to a $\ell_0$ norm regularization:

$$\min \mu \|m\|_0 + \frac{1}{2}\|d-Lm\|_2^2 \quad (3),$$

where a regularization parameter $\mu$ balances the sparsity of the solution and fidelity of the approximation to the data.

Two common themes that can be adopted to solve Equation (3) include: 1) greedy pursuit and 2) convex relaxation methods. So-called "greedy" strategies, such as strategies using matching pursuit type algorithms, can iteratively refine a sparse solution by successively identifying one or several components that yield an improvement in approximating the signal. These strategies can include relatively fast iterative procedures that are used extensively in practical applications, including sparse radon transform algorithms. The strategies take advantage of the sparsity structure by minimizing the $\ell_0$-norm, but they may converge to the local optima and require some prior information, like the cardinality s of the sparse solution. Therefore, the performance of the greedy strategies is not guaranteed in general, and only under strict conditions can they be shown to recover the sparest solution of the $\ell_0$ norm regularization.

Another approach for solving Equation (3) is to replace the nonconvex $\ell_0$ function by its convex relaxation $\ell_1$ norm, yielding the convex optimization Equation (2) for a high-resolution radon transform. Classical solutions to the $\ell_1$ norm minimization problem have been well studied in the last few years. Inspired by the shrinkage thresholding ideas, a great number of fast algorithms have been developed for solving large-scale $\ell_1$ minimization problems. These methods do not require any prior information, but cannot fully recover the sparsest solution.

In this disclosure, a super-resolution radon transform can be used to resolve a spike-train signal with fine scales based on solving the $\ell_0$ norm regularization Equation (3). The method is a two-stage iterative shrinkage/soft and hard thresholding algorithm which combines the good features of both greedy strategies and convex optimization approaches.

The first stage can use a shrinkage-based method to solve the $\ell_1$ norm regularization Equation (2) to generate a good initial point and give estimation on sparsity of the solution. Then an iterative hard thresholding algorithm (IHT) is applied to solve the $\ell_0$ norm regularization Equation (3) from the warm start obtained in the first Mage. These two operations are then repeated until the sparse representation m fits the data d.

Moreover, this two-stage algorithm can be embedded in a continuation technique by assigning a decreasing sequence of the regularization parameter $\mu$. Applications of this implementation can suppress multiples in a series of synthetic and field seismic data sets. The synthetic examples clearly show that the algorithm can separate overlapping events with small dip differences which usually cannot be detected by conventional high-resolution schemes. Tests on field data can also indicate that the method outperforms commonly-used algorithms.

A primary goal can be to obtain a sparsest solution of the $\ell_0$ norm regularization Equation (3) by solving the $\ell_1$ norm minimization Equation (2) with a combination of a greedy pursuit scheme.

One of the most popular methods for solving the $\ell_1$ regularization Equation (2) is the iterative shrinkage-thresholding algorithm (ISTA), where each iteration involves a forward and an inverse radon transform $L^T$ and L, followed by a shrinkage thresholding operator. In general, given a point $m_k$, the shrinkage procedure can generate a new point:

$$m_{k+1} = T_{\tau\mu}(m_k + \tau L^T(d - Lm_k)) \quad (4),$$

where $\tau$ is an appropriate step size, and $T_{\tau\mu}$ is the shrinkage-thresholding operator component-wise defined by:

$$T_{\tau\mu}(m)_i = \text{sign}(m_i) \times \max\{|m_i| - \tau\mu, 0\} \quad (5),$$

where sign(•) is 1, 0, or −1, according to the sign of the component. Intuitively, the effect of this operator $T_{\tau\mu}$ is to reduce the amplitude of each component of by $\tau\mu$ and vanish those negative results, thereby reducing the $\ell_1$-norm. Equation (4) is an extension of the classical gradient method, which can be independently derived from different considerations. This shrinkage operator can also be used for high-resolution radon transform.

The advantage of ISTA is its simplicity, and thus it is adequate for solving relative large-scale problems. The most appealing characteristic of this shrinkage scheme is that it yields the nonzero elements and their signs of the optimal solution of the $\ell_1$ regularization Equation (2) in a finite number of iterations. However, the sequence $\{m_k\}$ generated by Equation (4) can converge quite slowly to a solution. In fact, ISTA can behave like:

$$F(m_k) - F(\tilde{m}) \sim O(1/k) \quad (6),$$

where $F(m) := \mu\|m\|_1 + \frac{1}{2}\|d - Lm\|_2^2$ denotes the objective function of Equation (2), $\tilde{m}$ is the optimal solution, and k is the number of iterations.

In this disclosure, a fast version of ISTA (FISTA) can be used first, which keeps the simplicity as ISTA but shares a significantly improved complexity result. Starting from $m_0 = m_1 = 0$ and $t_0 = 1$, FISTA takes the form:

$$\begin{cases} t_{k+1} = \dfrac{1 + \sqrt{1 + 4t_k^2}}{2}, \\ z_k = m_k + \dfrac{t_{k-1} - 1}{t_k}(m_k - m_{k-1}), \\ m_{k+1} = T_{\tau\mu}(z_k + \tau L^T(d - Lz_k)) \end{cases} \quad (7)$$

The main difference between FISTA and ISTA is that the shrinkage-thresholding operator $T_{\tau\mu}$ is not employed on the previous point $m_k$, but rather on the point $z_k$ which uses a specific linear combination of the previous two points $\{m_k, m_{k-1}\}$. Obviously, the main computational effort in both ISTA and FISTA remains the same, namely, the gradient part followed by a shrinkage thresholding operator. The additional computation for FISTA in the first two steps of (7) is clearly marginal. It can be proved that, for a fixed $\mu$, FISTA has a significantly improved convergence rate, such as given by:

$$F(m_k) - F(\tilde{m}) \sim O(1/k^2) \quad (8).$$

Once an approximate solution $\tilde{m}$ of the $\ell_1$ regularization Equation (2) is obtained from FISTA, this solution can be used as a warm start for the next stage and can provide an estimation about the sparsity level of the image in the transform domain. First, the number $s_i$ of local optimal magnitude can be identified on each row of the image $\tilde{m}$. Then, the total number $s = \Sigma_i s_i$ can be considered as the sparsity estimation of $\tilde{m}$.

The second stage can apply an iterative hard thresholding algorithm to solve the $\ell_0$ norm regularization Equation (3). Among the modern pursuit methods, the iterative hard thresholding algorithm is the simplest one. The sparsest solution of the $\ell_0$ norm regularization problem can be recovered, provided that there is a prior estimation of the sparsity level of the solution. Let the initial $m_0 = \tilde{m}$, using the iteration:

$$m_{k+1} = H_s(m_k + \tau L^T(d - Lm_k)) \quad (9),$$

where $H_s$ is the hard thresholding operator that sets all but the s largest (in magnitude) elements in the vector to zero. It can be established that, under some conditions, the iterative hard thresholding method Equation (9) can recover the s-sparse solution with near optimal accuracy.

The previously-described iterative shrinkage and hard thresholding algorithms can be repeated until convergence criteria are satisfied. The combination of these two techniques can lead to the sparsest solution of the $\ell_0$-norm minimization problem. It is known that the traditional reweighted least-square (IRLS)-based sparse radon transform algorithms can require a matrix inverse operation at each iteration due to the update of the reweighted matrix. The proposed two-stage thresholding algorithm does not require any of those changes because the sparseness can be automatically achieved by the shrinkage and hard thresholding operators. In such scenario, the algorithm can significantly reduce computational time compared to the IRLS-based sparse radon transform algorithms. Also, the idea of combining a greedy pursuit with a convex optimization approach can be used, as greedy strategies are totally different.

There are two parameters remaining to be determined in the shrinkage and hard thresholding iterations, that is, the regularizing parameter $\mu$ and the step length $\tau$. Several methods differ in the strategies to pick the parameters in each iteration. In this disclosure, a Barzilai-Borwein technique and continuation approach can be applied to dynamically update these parameters.

For the step length $\tau$, since it approximates the inverse Hessian of the smooth function:

$$g(m) := \frac{1}{2}\|d - Lm\|_2^2, \ \tau \approx \left(\frac{\nabla g(m_k) - \nabla g(m_{k-1})}{m_k - m_{k-1}}\right)^{-1},$$

in the least-square sense, hence:

$$\tau = \underset{\tau}{\operatorname{argmin}} \|\tau(\nabla g(m_k) - \nabla g(m_{k-1})) - (m_k - m_{k-1})\|_2^2$$
$$= \frac{\langle m_k - m_{k-1}, m_k - m_{k-1} \rangle}{\langle m_k - m_{k-1}, \nabla g(m_k) - \nabla g(m_{k-1}) \rangle}.$$

Having already computed:

$$\nabla g(m_k) = L^T(d - Lm_k)$$

and $$\nabla g(m_{k-1}) = L^T(d - Lm_{k-1})$$

in the iterations, the dominant computational effort of this step only involves relatively simple vector operations. Since the parameter $\tau$ has the same function in IHT the Barzilai-Borwein method can also be used to choose the step size $\tau$. Different techniques can be used for stability control of IHT.

The parameter $\mu$ in the $\ell_1$ regularization Equation (2) governs the tradeoff between the representation error and its sparsity. Large values of $\mu$ typically produce sparser results. However, the theory for penalty functions implies that the solution of the quadratic regularization Equation (2) converges to the following $\ell_1$ norm minimization Equation (10):

$$\min \|m\|_1, \text{s.t.} \, d = Lm \tag{10}$$

as $\mu$ goes to zero. Therefore, $\mu$ fixes the accuracy of the regularization Equation (2) to the $\ell_1$ norm. However, the practical performance can degrade by directly solving Equation (2) for small values of $\mu$. Therefore, it may be difficult to select an appropriate value for the regularization parameter $\mu$ in advance, since it does not control the sparsity directly. In some cases, curves can be used to trace the optimal trade-off between the data misfit and the sparsity of the model.

A continuation technique can be used to dynamically choose the parameter $\mu$. This technique can find solutions to a succession of Equations (2) with a decreasing sequence:

$$\mu_0 > \mu_1 >> \bar{\mu},$$

where $\bar{\mu}$ is a small number based on a desired accuracy. The idea is simple: when a new problem associated with $\mu_{k+1}$, is to be solved, the current solution with $\mu_k$ can be used as a warm start. The point of this is that solving Equation (2) can be faster when $\mu$ is large. Therefore, these intermediate solutions are relatively inexpensive to compute and provide a string of convenient first guesses for the next problem. It can be shown empirically that the continuation strategy is generally superior on increasing the speed of convergence to that of directly applying the specified. small value $\bar{\mu}$. For the first choice $\mu_0$, since the initial value of FIESTA is zero, iteration Equation (7) makes clear that $\mu_0$ plays the role of a threshold to $L^T d$. A first choice may then be $\mu_0 = 0.9 \, L^T \, d_2$. It can be observed that $\bar{\mu}$ is directly linked to the desired accuracy in the noise-free case. For example, if the algorithm terminates when the relative error $d - Lm_2/d_2$ is less than 10%, then $\bar{\mu} = 0.01$ is a fairly natural option for $\bar{\mu}$.

The purpose of the super-resolution radon transform is to resolve the superposition of the point-wise events in the radon domain. It is known that the separability of different events in the time-space domain is directly related to the sampling and aperture of the data. Let $\theta$ be the dip difference of two events, then $\tan \theta$ is the slope of the time change per space in the sample. The overlapping events can be separated if:

$$\tan \theta \geq \frac{1}{f_{max} \Delta t n_x}, \tag{11}$$

where $f_{max}$ is the maximum frequency of interest, $\Delta t$ is the time sample rate, and $n_x$ is the number of space samples. The performance of the proposed super-resolution radon transform can be demonstrated by means of a synthetic example.

Figure 2A:
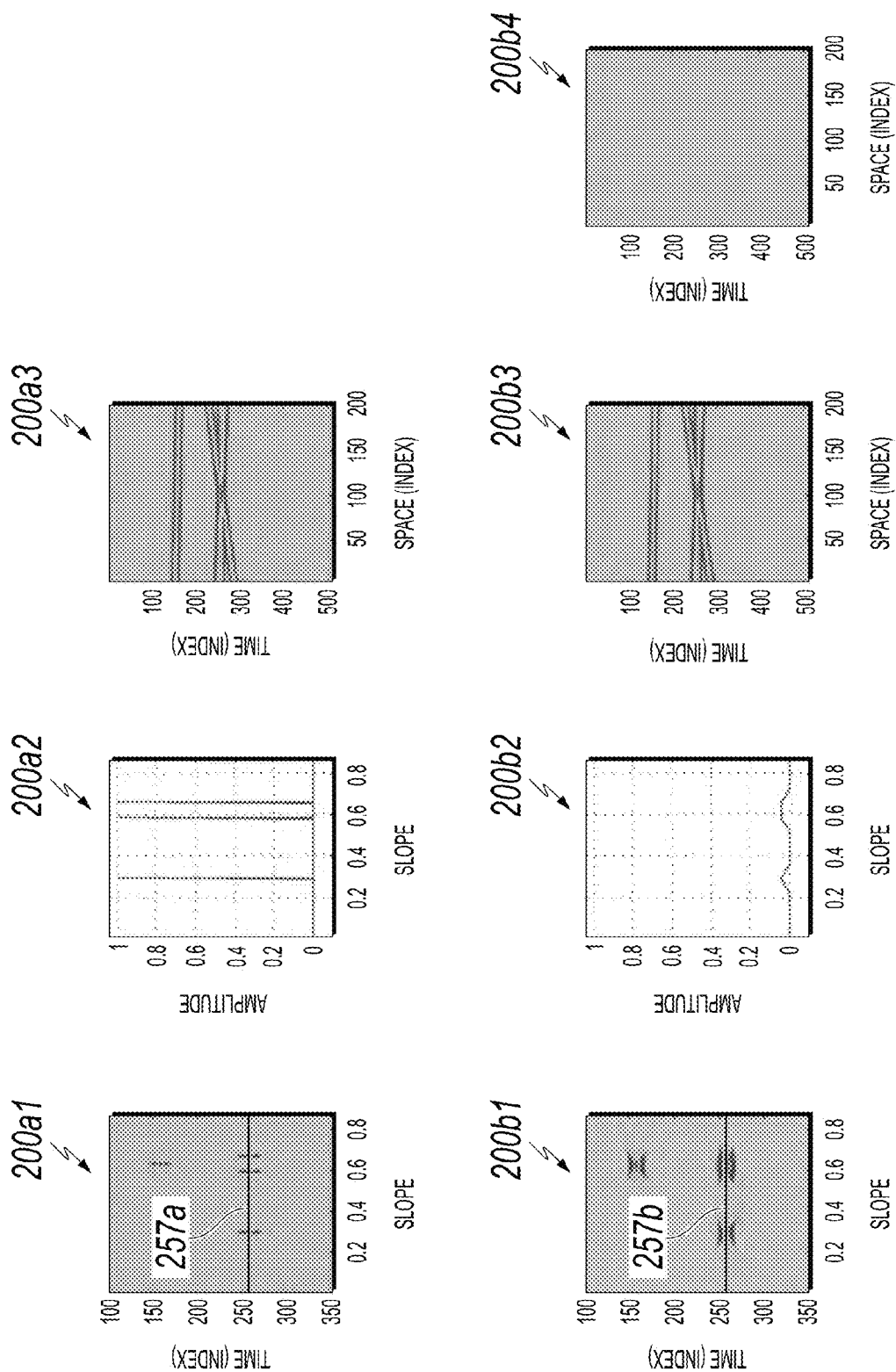
FIGS. 2A and 2B illustrate example graphs that provide a comparison of radon transforms on synthetic examples with a four-degree move-out difference, according to an implementation.
Figure 2B:
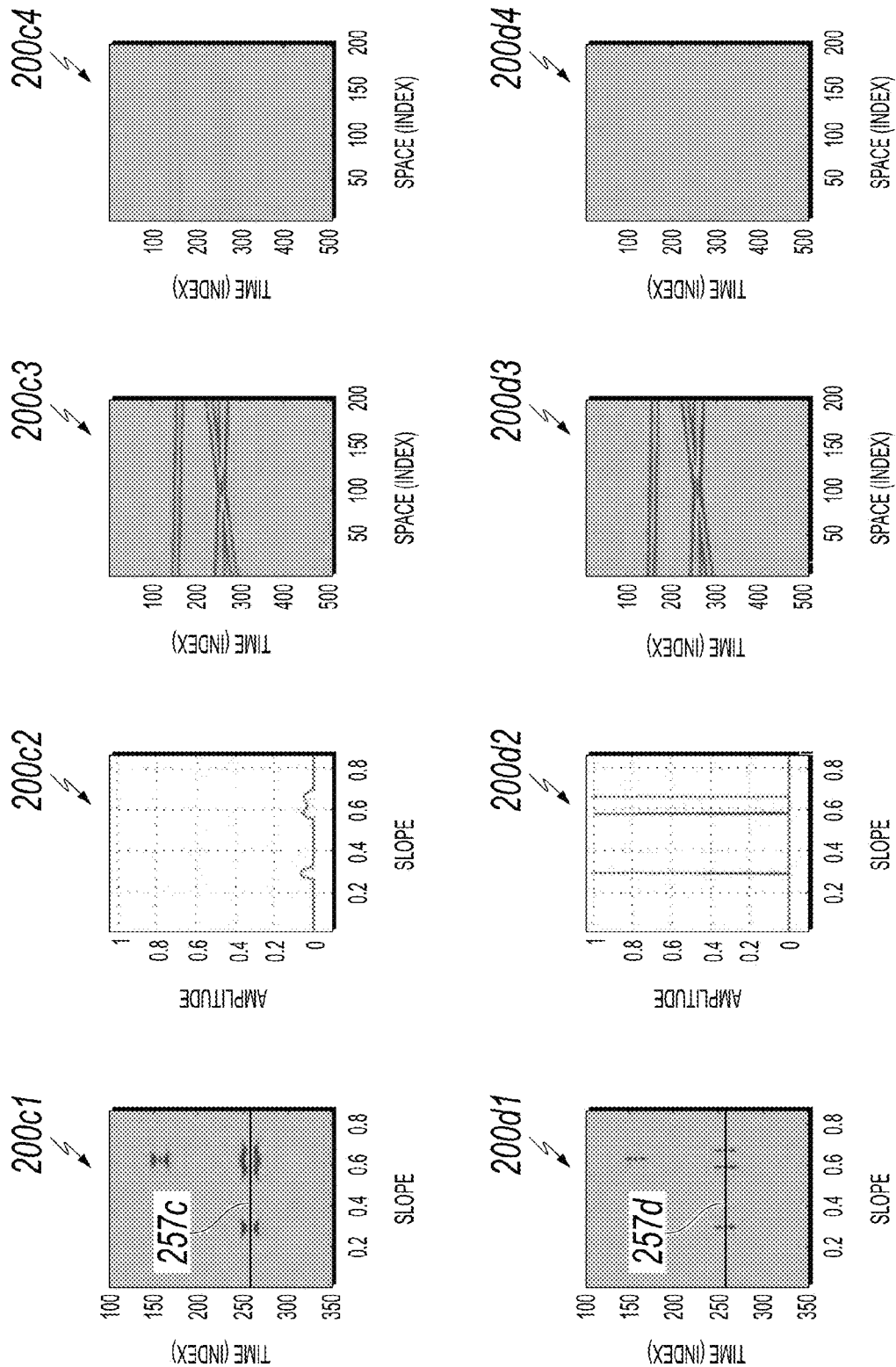

FIGS. 2A and 2B illustrate example graphs 200a1-200a3, 200b1-200b4, 200c1-200c4, and 200d1-200d4 that provide a comparison of radon transforms on synthetic examples with a four-degree move-out difference, according to an implementation. Graph 200a1 shows an ideal radon transform. Graph 200a2 shows amplitudes of line 257a in graph 200a1. Graph 200a3 shows linear events. Graph 200b1 shows a standard radon transform. Graph 200b2 is an amplitude of line 257b in graph 200b1. Graph 200b3 shows reconstruction from a standard radon transform. Graph 200b4 shows a 1% data residual. Graph 200c1 shows a high-resolution radon transform. Graph 200c2 shows an amplitude of the line 257c in graph 200c1. Graph 200c3 is a reconstruction from high-resolution radon transform. Graph 200c4 is a 10% data residual. Graph 200d1 is a super-resolution. Graph 200d2 shows the amplitude of the line 257d in graph 200d1. Graph 200d3 is a reconstruction from a super-resolution radon transform. Graph 200c4 is a 1% data residual.

In the first row of FIG. 2A (illustrating graphs 200a1-200a3), four Ricker wavelets in graph 200a1 with 15 Hertz (Hz) dominant frequency in the radon domain generate four linear events in graph 200a3 from the linear inverse radon transform. Graph 200a2 shows the amplitude of the line 257a of graph 200a1 in the radon space with the time index equal to the line 257a. As illustrated in FIG. 2A, the two wavelets on the right side of the radon domain in graph 200a1 are proximate, so that the overlapping events in the middle of graph 200a3 have only four-degree dip difference. With the limited aperture range in offset, they exhibit a strong interference pattern in the time-space domain in graph 200a3. The standard, high-resolution and super-resolution radon transform can be compared in the experiment. The model obtained from different methods are listed in the first (left) column of FIGS. 2A and 2B, in which the amplitudes of lines 257a-257d, used as a time index, are presented in the second (next) column, respectively. The reconstructed events are shown in the third column and data residuals in the fourth column. Graph 200b1 is the standard radon transform result obtained by the conjugate gradient method.

Although the data residual $d - Lm_2/d_2$ is less than 1% in graph 200b4, some smearing effects are illustrated in graph 200b1 for the standard radon transform. As a result, the two wavelets on the right side cannot be separated in graph 200b2. Graph 200c1 (in FIG. 2B) displays the high-resolution radon transform result obtained from ISTA with fifteen iterations. It is clear that the two overlapping events have been separated into different zones in the radon domain in graph 200c1. The recovered image in graph 200c3 is similar to the model with a 10% data residual, as shown in graph 200c4. With this result as an initial step, the super-resolution radon transform in graph 200d1 and the true amplitude in graph 200d2 can be obtained with three hard thresholding iterations, where each hard thresholding iteration is followed by five shrinkage iterations. The results are virtually identical to the model. Moreover, the reconstructed image in graph 200d3 is accurate and, as illustrated in graph 200d4, a data residual of less than a 1%.

Figure 3A:
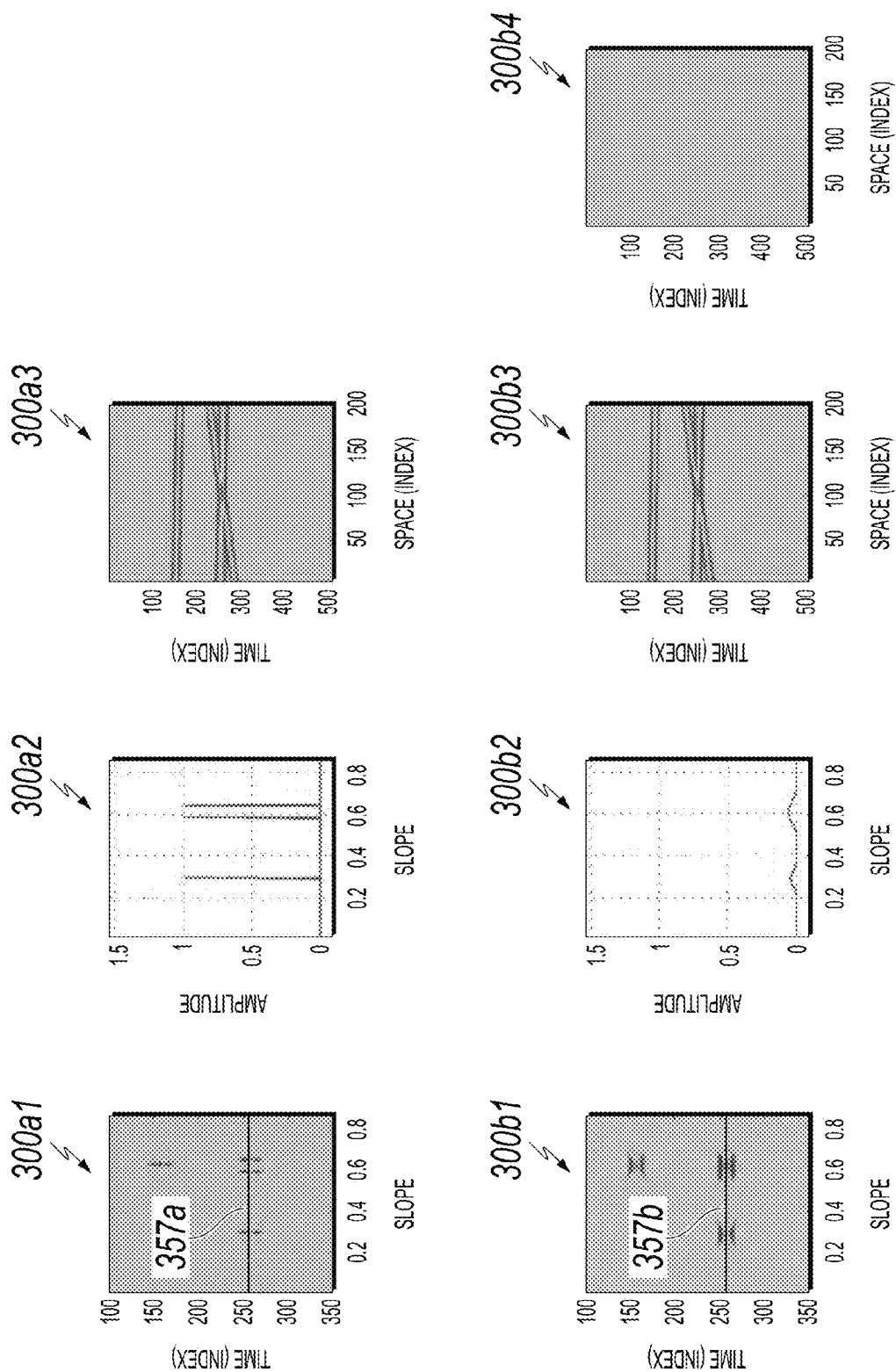
FIGS. 3A and 3B illustrate example graphs that illustrate a comparison of radon transforms on synthetic examples with a three-degree move-out difference, according to an implementation.
Figure 3B:
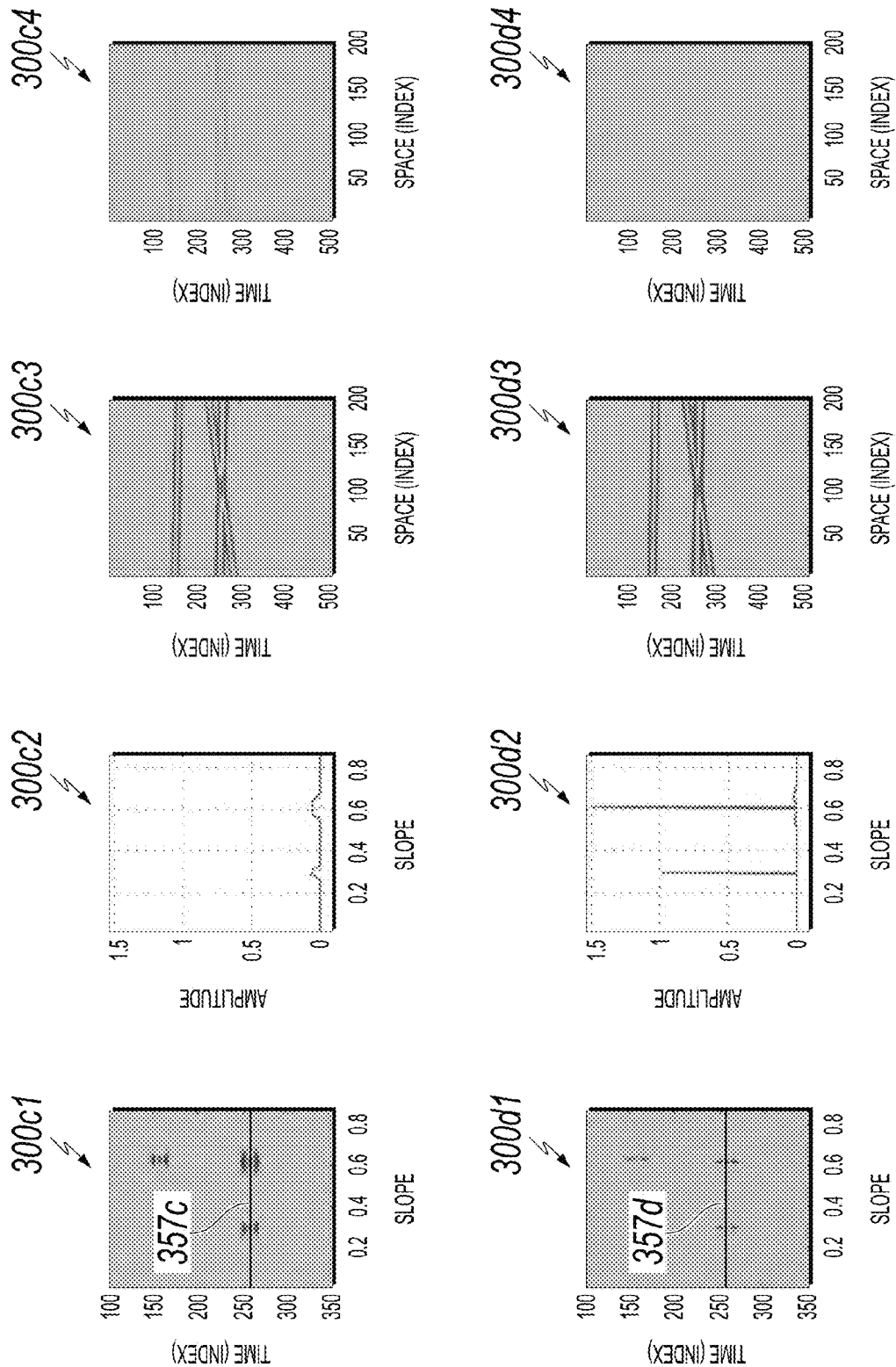

FIGS. 3A and 3B illustrate example graphs 300a1-300a3, 300b1-300b4, 300c1-300c4, and 300d1-300d4 that illustrate a comparison of radon transform on synthetic examples with a three-degree move-out difference, according to an implementation. Graph 300a1 shows an ideal radon transform. Graph 300a2 shows amplitudes of line 357a in graph 300a1. Graph 300a3 shows four linear events. Graph 300b1 shows a standard radon transform. Graph 300b2 shows an amplitude of line 357b in graph 300b1. Graph 300b3 shows a reconstruction from a standard radon transform. Graph 300b4 shows a 1% data residual. Graph 300c1 (FIG. 3B) shows a high-resolution radon transform. Graph 300c2 shows an amplitude of the line 357c in graph 300c1. Graph 300c3 shows a reconstruction from high-resolution radon transform. Graph 300c4 shows a 10% data residual. Graph 300d1 shows a super-resolution. Graph 300d2 shows an amplitude of the line 357d in graph 300d1. Graph 300d3 shows a reconstruction from a super-resolution radon transform. Graph 300c4 shows a 1% data residual.

In the second experiment, the two Ricker wavelets on the right side of the radon domain can be moved closer in graph 300a1, so that the events they produce have only three-degree dip difference as in graph 300a3. The separability condition (Equation (11)) does not hold. Graphs 300b1-300b1, 300c1-300c1, and 300d1-300d1 show the results obtained by the standard radon transform, high-resolution radon transform, and super-resolution radon transform, respectively, with the same order as in the graphs of FIGS. 2A and 2B.

While all of the illustrated methods fail to isolate the interfering events, the problem can be solved by adding a band-pass filter on the data to increase the dominant frequency to 30 Hz; then Equation (11) will hold. The results obtained by the standard radon transform, high-resolution radon transform, and super-resolution radon transform are presented in graphs of FIGS. 4A and 4B as in the same order with the graphs of FIGS. 2A and 2B.

Figure 4A:
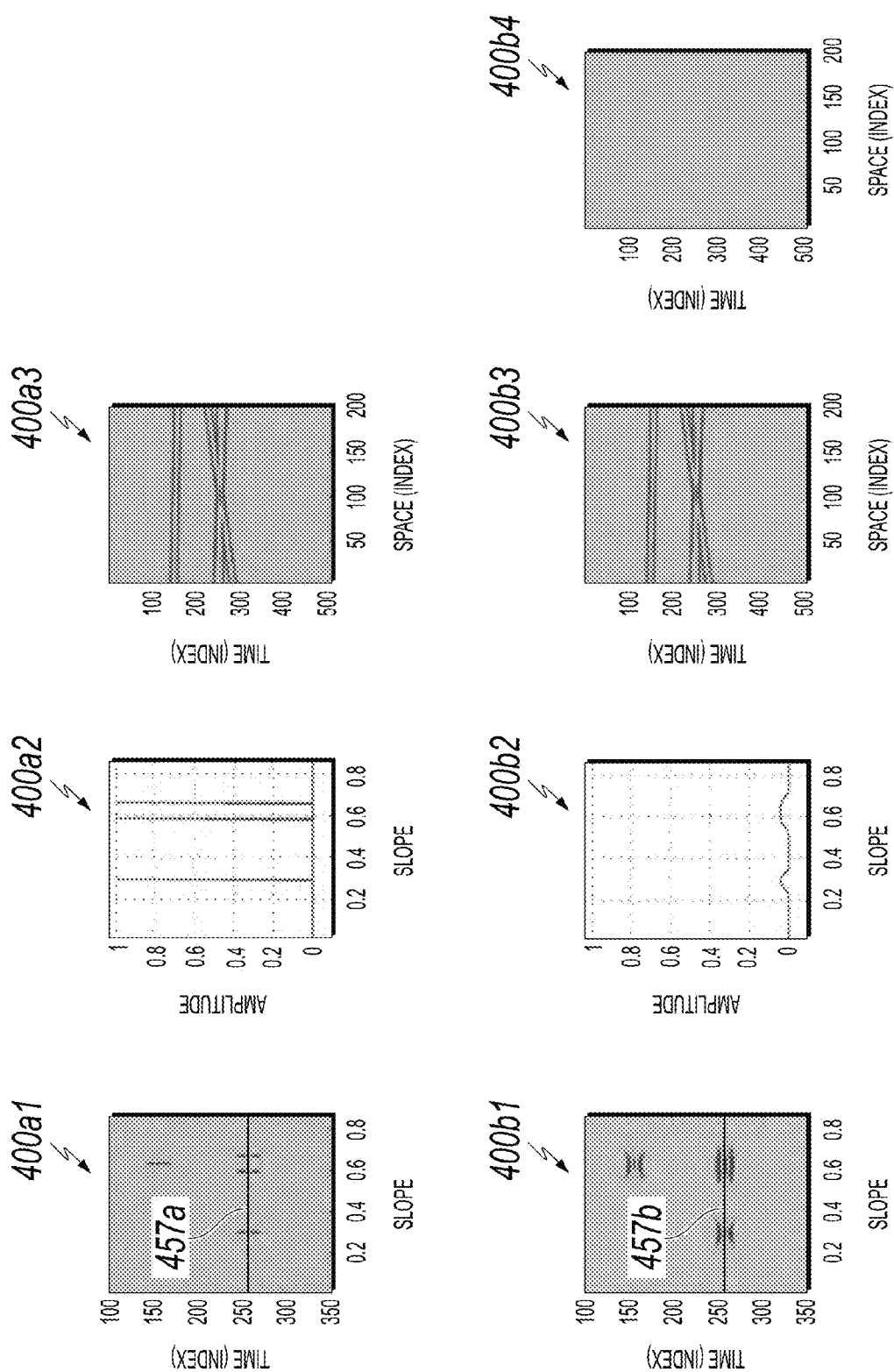
FIGS. 4A and 4B illustrate example graphs that illustrate a comparison of radon transforms on synthetic examples with a three-degree move-out difference after filtering, according to an implementation.
Figure 4B:
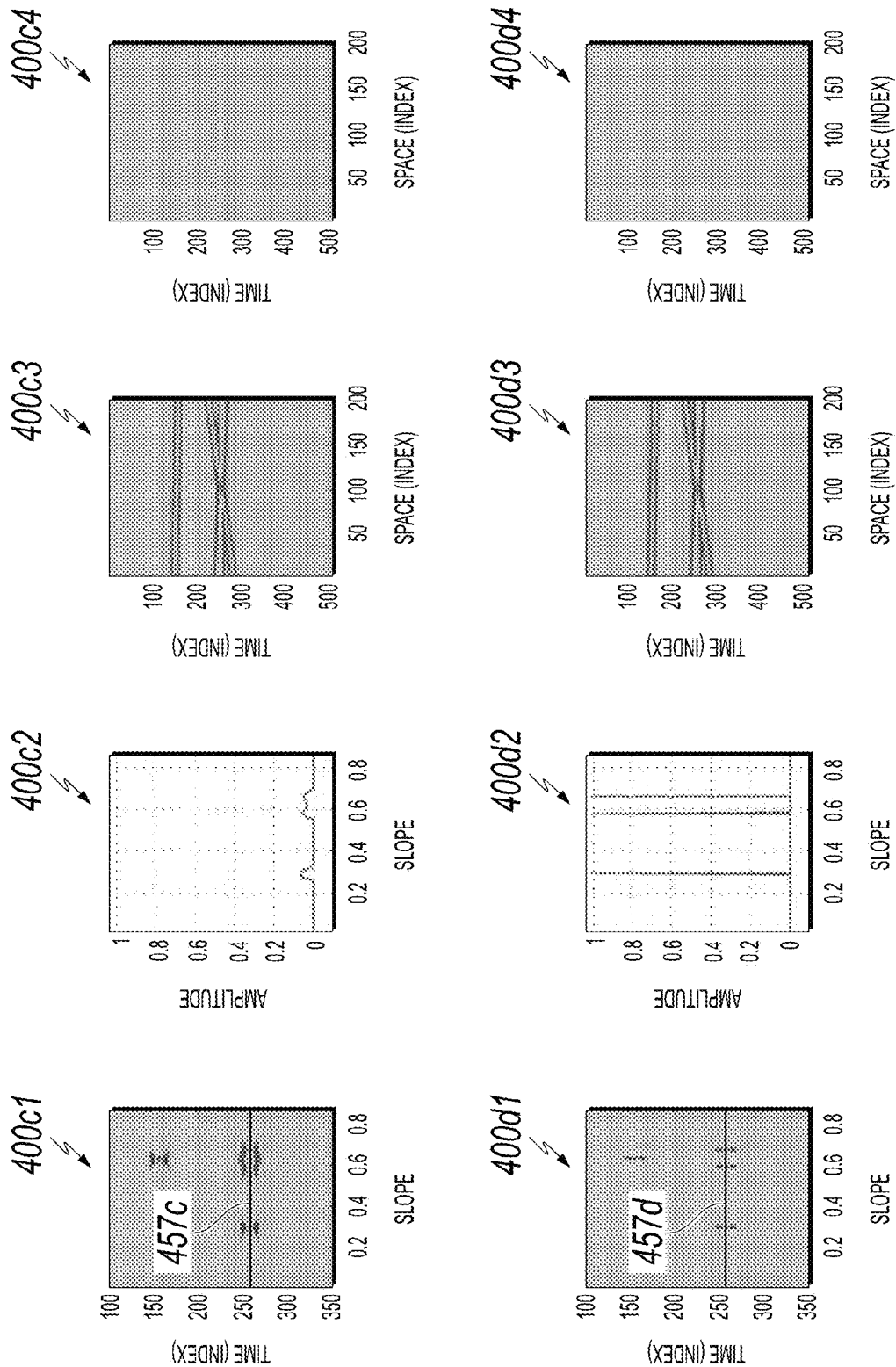

FIGS. 4A and 4B illustrate example graphs 400a1-400a3, 400b1-400b4, 400c1-400c4, and 400d1-400d4 that illustrate a comparison of radon transform on synthetic examples with a three-degree move-out difference after filtering, according to an implementation. Graph 400a1 shows an ideal radon transform. Graph 400a2 shows amplitudes of line 457a in graph 400a1. Graph 400a3 shows four linear events. Graph 400b1 shows a standard radon transform. Graph 400b2 shows an amplitude of line 457b in graph 400b1. Graph 400b3 shows a reconstruction from a standard radon transform. Graph 400b4 shows a 1% data residual. Graph 400c1 (FIG. 4B) shows a high-resolution radon transform. Graph 400c2 shows an amplitude of the line 457c in graph 400c1. Graph 400c3 shows a reconstruction from high-resolution radon transform. Graph 400c4 shows a 10% data residual. Graph 400d1 shows a super-resolution. Graph 400d2 shows an amplitude of the line 457d in graph 400d1. Graph 400d3 shows a reconstruction from a super-resolution radon transform. Graph 400c4 shows a 1% data residual.

The standard radon transform still failed in identifying the two closed events in the radon space in graph 400b1. However, with the initial graph 400c1 returned by the shrinkage process, the super-resolution radon transform in graph 400d1 recovers the true sparse signal in the radon space with, as shown in graph 400d4, data residuals less than 1%.

FIGS. 5A-5D collectively illustrate an example comparison of a standard, a high-resolution, and a super-resolution radon transform on a field data example, according to an implementation. For example, FIGS. 5A-5D include post-stack data 500a, a standard radon transform 500b, a high-resolution radon transform 500c, and a super-resolution radon transform 500d.

FIGS. 5A-5D present a comparison between the radon transforms of the same stacked data 500a computed by the standard radon transform using the conjugate gradient method 500b, the high-resolution radon transform 500c and the super-resolution radon transform 500d. As can be seen in FIGS. 5A-5D, the standard radon transform shows typical tails and artifacts in the radon domain with limited aperture. The high-resolution radon transform returned from the shrinkage stage shows cleaner result 500c. The artifacts have almost disappeared in the spike-formed super-resolution radon transform. In particular, for the part with time index around 300-400, the weak events exhibit a strong interference pattern in the standard radon transform. However, they have been separated and enhanced into different spikes in the super-resolution radon transform. Although the achievement of super-resolution radon transform has many applications, multiple removal is probably the most important one.

Figure 6:
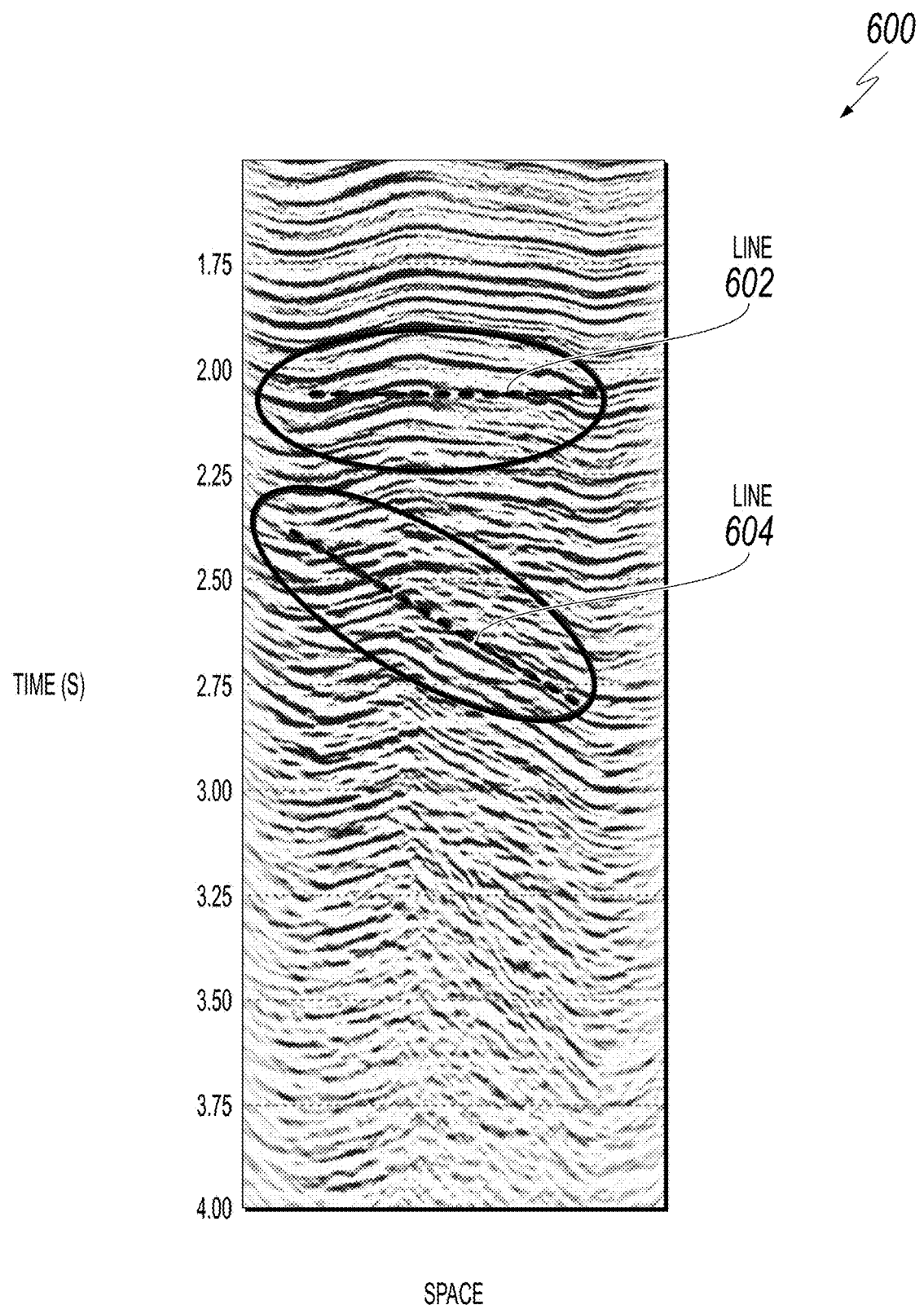
FIG. 6 illustrates an example post-stack data set, according to an implementation.

FIG. 6 illustrates an example post-stack data set 600, according to an implementation. FIG. 6 contains a stacked section of a real data set, according to an implementation. Lines 602 and 604 indicate significant areas in the post-stack data set 600. Note that the events in the shallow part are really strong, and the large move-out differences appear from 2.3 seconds at line 602. Line 604 shows some dipping (tilt) layers overlapping with flat layers. After flattening the shallow part of this data, it is reasonable to assume that all the flat events that appear after 2.3 seconds are multiples. Because of the flexibility of the time domain algorithm, the radon transform space can be computed only below 2.3 seconds. The experiment can cut, for example, the input data into 63 vertical slices each with 50 traces×601 time samples. Other slices with other traces and times samples can be used, and the standard radon transform and super-resolution radon transform can be applied on each slice, respectively. Since the difference in move-out decreases with offset, the narrow window would increase the difficulty to separate the multiples from primaries. The same automatic muting in the radon space can be applied to eliminate the multiples, and from this filtered space an inverse radon transform algorithm can be done to recover the primaries.

Figure 7A:
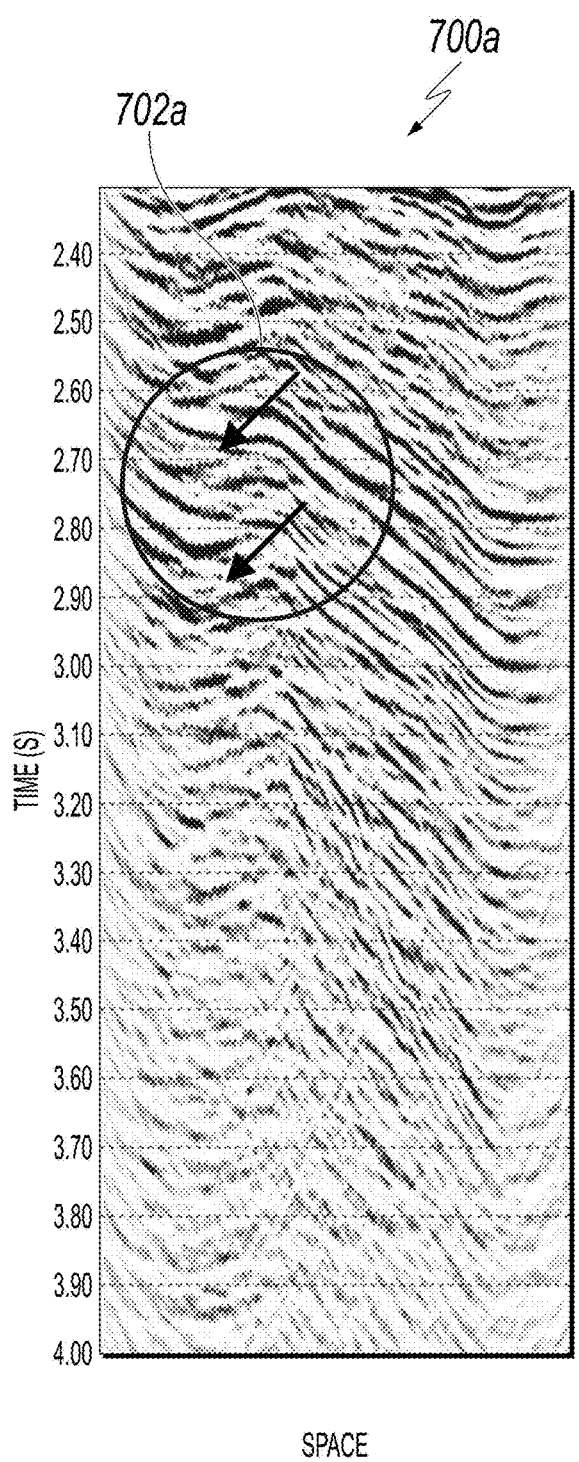
FIG. 7A illustrates example primaries obtained from a super-resolution radon transform, according to an implementation.
Figure 7B:
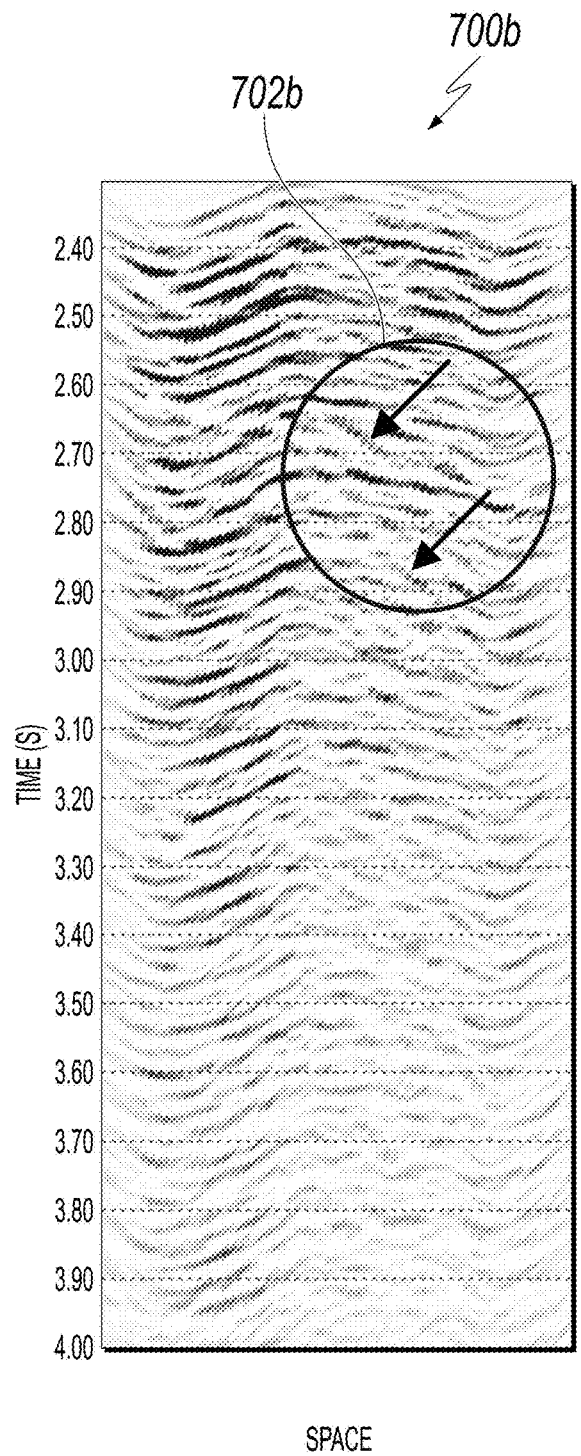
FIG. 7B illustrates example multiples obtained by subtraction, according to an implementation, according to an implementation.

FIG. 7A illustrates example primaries 700a obtained from a super-resolution radon transform, according to an implementation. FIG. 7B illustrates example multiples 700b obtained by subtraction, according to an implementation. For example, FIGS. 7A-7B illustrate the performance of the super-resolution radon transform in separating primaries 700a from multiples 700b. Arrows 702a and 702b indicate significant portions of the data.

Figure 8:
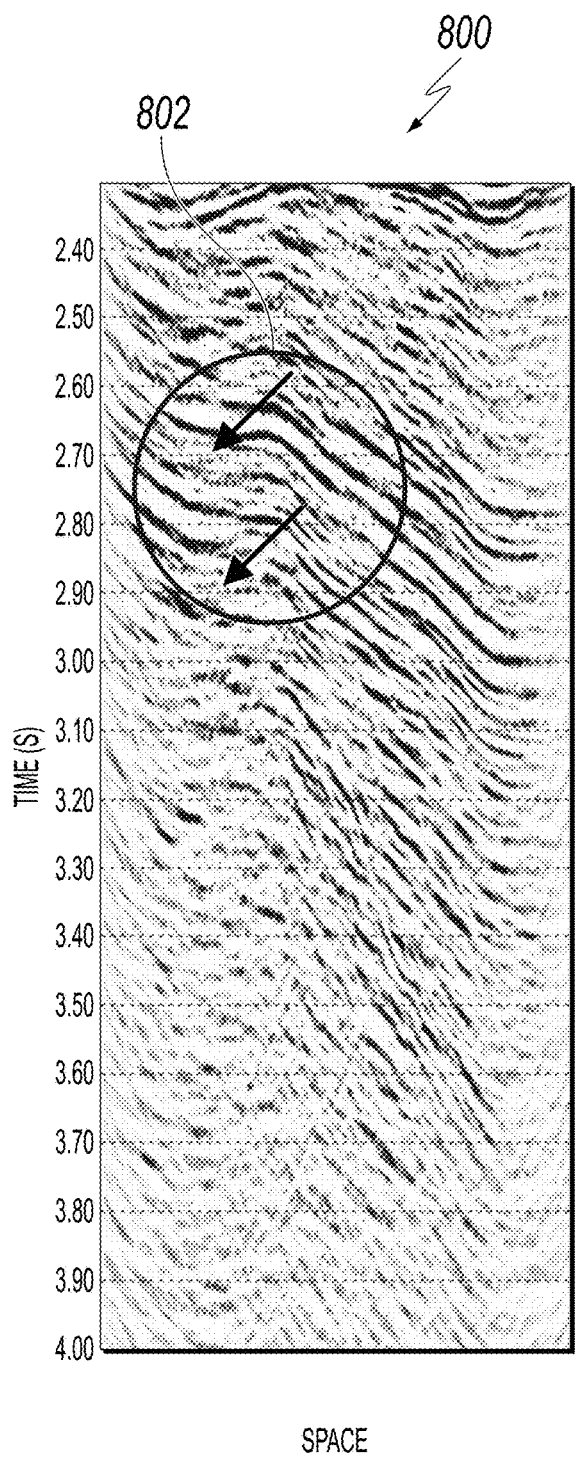
FIG. 8 illustrates example primaries obtained from a standard radon transform, according to an implementation.
Figure 9:
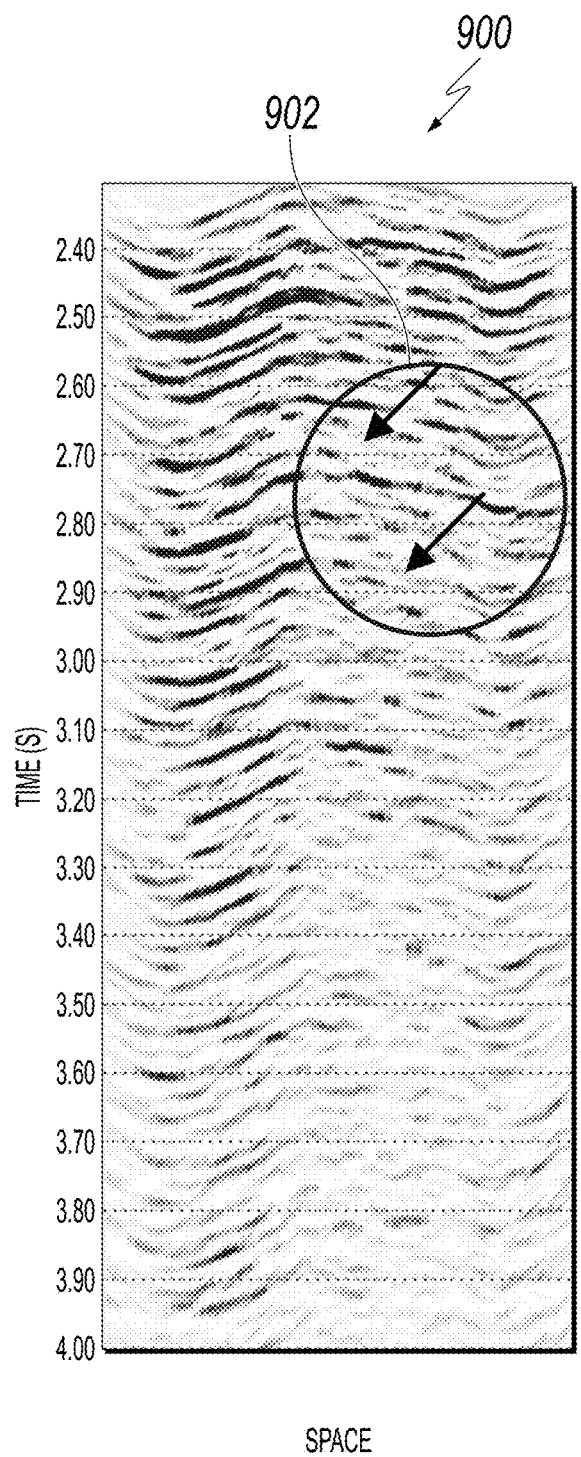
FIG. 9 illustrates example multiples obtained by subtraction, according to an implementation.

FIG. 8 illustrates example primaries 800 obtained from a standard radon transform, according to an implementation. FIG. 9 illustrates example multiples 900 obtained by subtraction, according to an implementation. As a comparison, FIG. 8 and FIG. 9 present the same section of primaries and multiples with using a standard radon transform. Arrows at 802 and 902 indicate significant portions of the data. Leakage of dipping primaries (indicated by arrows 902) can be seen in the multiples of FIG. 9 and some unwanted flat events left in the primaries of FIG. 8 (indicated by arrows 802). As a comparison, these artifacts were not observed in the super-resolution radon transform FIGS. 7A and 7B (indicated by arrows 702a and 702b, respectively).

In conclusion, this disclosure describes the use of a super-resolution radon transform to recover a spike-train signal with fine scales by solving a $\ell_0$ norm optimization problem. The algorithm combines the good feature of both greedy strategies and convex optimization approaches. In the proposed method, the sparsest model in the radon domain is automatically achieved by alternatively applying the shrinkage and hard thresholding operators in the iterations. By embedding the basic two-stage algorithm in a continuation technique and by assigning a decreasing sequence of value to the regularization parameter μ, the algorithm can exhibit state-of-the-art performance both in terms of its speed and its ability to recover sparse signals.

This super-resolution radon transform provides an interesting new approach not only to the correct reconstruction of the original signal but also to separate the signal from noise with small move-out differences. From the examples illustrated in this disclosure, the improvement in resolution can be considerable, and the performance of the super-resolution radon transform in separating primaries from multiples is superior to that of the standard radon transform.

Figure 10:
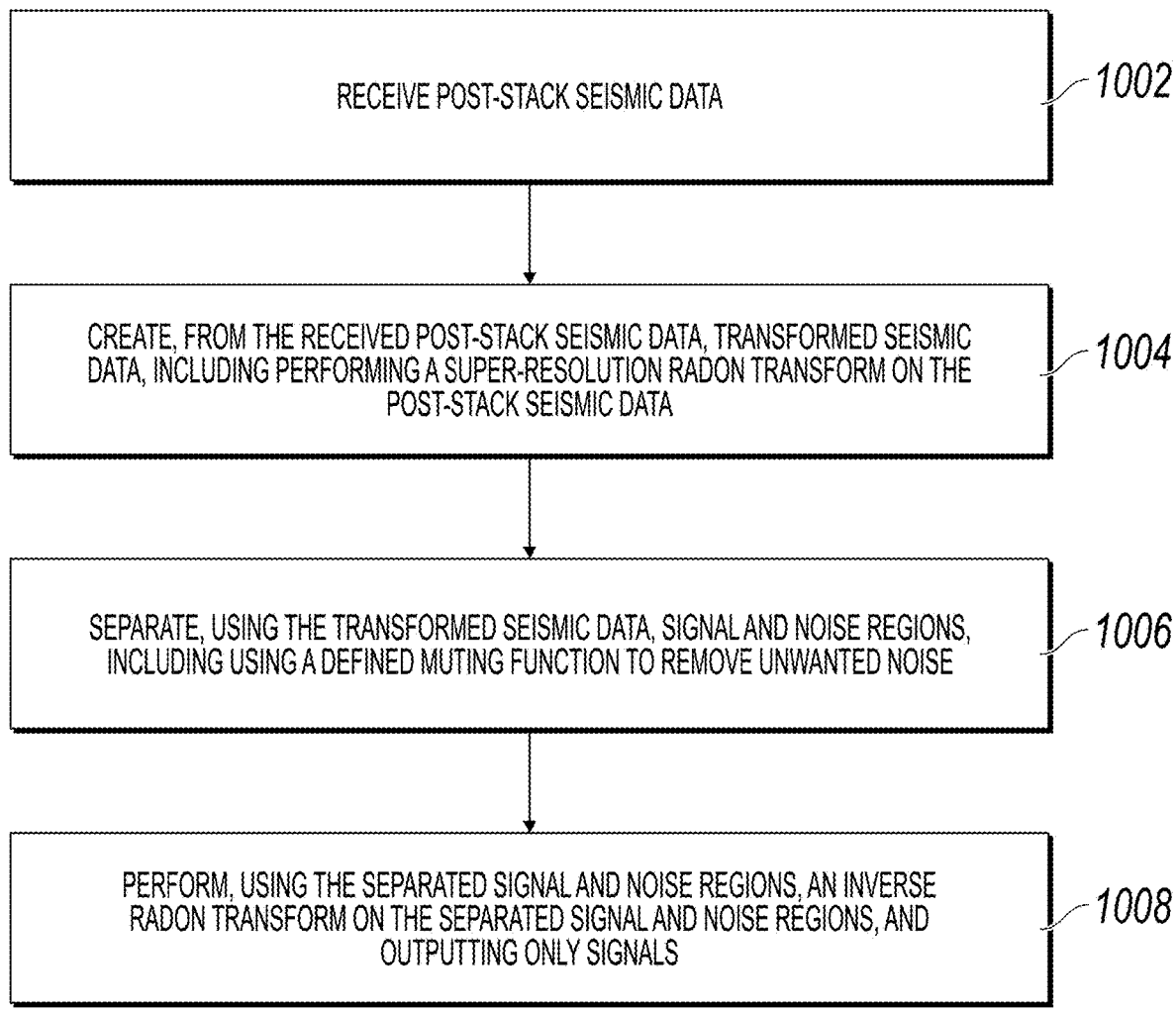
FIG. 10 is a flowchart illustrating an example method for performing a super-resolution radon transform on seismic data, according to an implementation.

FIG. 10 is a flowchart illustrating an example method 1000 for performing a super-resolution radon transform on seismic data, according to an implementation. For clarity of presentation, the description that follows generally describes method 1000 in the context of the other figures in this description. However, it will be understood that method 1000 may be performed, for example, by any suitable system, environment, software, and hardware, or a combination of systems, environments, software, and hardware, as appropriate. In some implementations, various steps of method 1000 can be run in parallel, in combination, in loops, or in any order.

At 1002, post-stack seismic data is received. For example, the post-stack data can be the post-stack data 500a as described with reference to FIG. 5A. From 1002, method 1000 proceeds to 1004.

At 1004, transformed seismic data is created from the received post-stack seismic data, including performing a super-resolution radon transform on the post-stack seismic data. As an example, the transformed seismic data that is created can be the standard radon transform 500b, the high-resolution radon transform 500c, or the super-resolution radon transform 500d as described with reference to FIGS. 5B-5D, respectively. From 1004, method 1000 proceeds to 1006.

In some implementations, creating the transformed seismic data can include: applying a soft thresholding algorithm to the seismic data; subsequently applying a hard thresholding algorithm to the seismic data; repeating the applying of the soft thresholding algorithm and the hard thresholding algorithm until a threshold condition is met; and outputting a super-resolution radon domain. For example, the threshold condition can be determined according to the formula:

$$\frac{\|d - Lm\|_2}{\|d\|_2} < \epsilon, \quad (12)$$

where d is observed data, L is an inverse linear radon transform, m is a data approximation model, and ϵ is a predefined small positive number. In some implementations, creating the transformed seismic data includes decomposing each complex signal into a set of simple spike-train signals.

At 1006, signal and noise regions are separated using the transformed seismic data, including using a defined muting function to remove unwanted noise. For example, the signal and noise regions can be separated, such as by defining and using muting function to remove some unwanted noise. From 1006, method 1000 proceeds to 1008.

At 1008, an inverse radon transform is performed using the separated signal and noise regions, outputting only signals. For example, an ISTA can be used, where each iteration involves a forward and an inverse radon transform $L^T$ and L, followed by a shrinkage thresholding operator, as described with the use of Equation (4). From 1008, method 1000 stops. After 1008, method 1000 stops.

Figure 11:
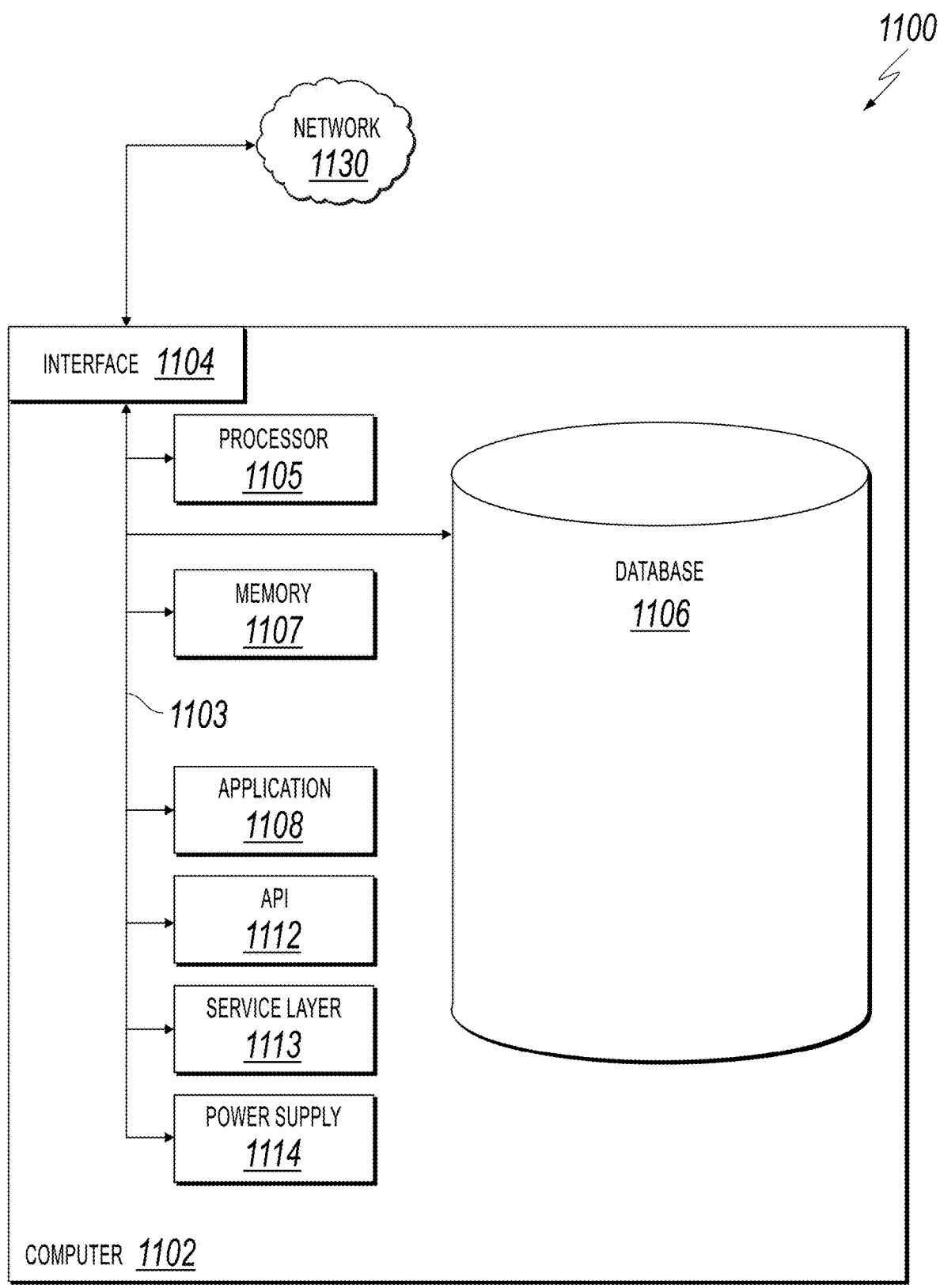
FIG. 11 is a block diagram illustrating an example computer system used to provide computational functionalities associated with described algorithms, methods, functions, processes, flows, and procedures as described in the instant disclosure, according to an implementation.

FIG. 11 is a block diagram illustrating an example computer system 1100 used to provide computational functionalities associated with described algorithms, methods, functions, processes, flows, and procedures, as described in the instant disclosure, according to an implementation. The illustrated computer 1102 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 1102 may comprise a computer that includes an input device, such as a keypad, keyboard, touch screen, or other device that can accept user information, and an output device that conveys information associated with the operation of the computer 1102, including digital data, visual, or audio information (or a combination of information), or a graphical user interface (GUI).

The computer 1102 can serve in a role as a client, network component, a server, a database or other persistency, or any other component (or a combination of roles) of a computer system for performing the subject matter described in the instant disclosure. The illustrated computer 1102 is communicably coupled with a network 1130. In some implementations, one or more components of the computer 1102 may be configured to operate within environments, including cloud-computing-based, local, global, or other environment (or a combination of environments).

At a high level, the computer 1102 is an electronic computing device operable to receive, transmit, process, store, or manage data and information associated with the described subject matter. According to some implementations, the computer 1102 may also include or be communicably coupled with an application server, e-mail server, web server, caching server, streaming data server, or other server (or a combination of servers).

The computer 1102 can receive requests over network 1130 from a client application (for example, executing on another computer 1102) and respond to the received requests by processing the received requests using an appropriate software application(s). In addition, requests may also be sent to the computer 1102 from internal users (for example, from a command console or by other appropriate access method), external or third-parties, other automated applications, as well as any other appropriate entities, individuals, systems, or computers.

Each of the components of the computer 1102 can communicate using a system bus 1103. In some implementations, any or all of the components of the computer 1102, hardware or software (or a combination of both hardware and software), may interface with each other or the interface 1104 (or a combination of both), over the system bus 1103 using an application programming interface (API) 1112 or a service layer 1113 (or a combination of the API 1112 and service layer 1113). The API 1112 may include specifications for routines, data structures, and object classes. The API 1112 may be either computer-language independent or dependent and refer to a complete interface, a single function, or even a set of APIs. The service layer 1113 provides software services to the computer 1102 or other components (whether or not illustrated) that are communicably coupled to the computer 1102. The functionality of the computer 1102 may be accessible for all service consumers using this service layer. Software services, such as those provided by the service layer 1113, provide reusable, defined functionalities through a defined interface. For example, the interface may be software written in JAVA, C++, or other suitable language providing data in extensible markup language (XML) format or other suitable format. While illustrated as an integrated component of the computer 1102, alternative implementations may illustrate the API 1112 or the service layer 1113 as stand-alone components in relation to other components of the computer 1102 or other components (whether or not illustrated) that are communicably coupled to the computer 1102. Moreover, any or all parts of the API 1112 or the service layer 1113 may be implemented as child or sub-modules of another software module, enterprise application, or hardware module without departing from the scope of this disclosure.

The computer 1102 includes an interface 1104. Although illustrated as a single interface 1104 in FIG. 11, two or more interfaces 1104 may be used according to particular needs, desires, or particular implementations of the computer 1102. The interface 1104 is used by the computer 1102 for communicating with other systems that are connected to the network 1130 (whether illustrated or not) in a distributed environment. Generally, the interface 1104 comprises logic encoded in software or hardware (or a combination of software and hardware) and is operable to communicate with the network 1130. More specifically, the interface 1104 may comprise software supporting one or more communication protocols associated with communications such that the network 1130 or interface's hardware is operable to communicate physical signals within and outside of the illustrated computer 1102.

The computer 1102 includes a processor 1105. Although illustrated as a single processor 1105 in FIG. 11, two or more processors may be used according to particular needs, desires, or particular implementations of the computer 1102. Generally, the processor 1105 executes instructions and manipulates data to perform the operations of the computer 1102 and any algorithms, methods, functions, processes, flows, and procedures as described in the instant disclosure.

The computer 1102 also includes a database 1106 that can hold data for the computer 1102 or other components (or a combination of both) that can be connected to the network 1130 (whether illustrated or not). For example, database 1106 can be an in-memory, conventional, or other type of database storing data consistent with this disclosure. In some implementations, database 1106 can be a combination of two or more different database types (for example, a hybrid in-memory and conventional database) according to particular needs, desires, or particular implementations of the computer 1102 and the described functionality. Although illustrated as a single database 1106 in FIG. 11, two or more databases (of the same or combination of types) can be used according to particular needs, desires, or particular implementations of the computer 1102 and the described functionality. While database 1106 is illustrated as an integral component of the computer 1102, in alternative implementations, database 1106 can be external to the computer 1102.

The computer 1102 also includes a memory 1107 that can hold data for the computer 1102 or other components (or a combination of both) that can be connected to the network 1130 (whether illustrated or not). For example, memory 1107 can be random access memory (RAM), read-only memory (ROM), optical, magnetic, and the like, storing data consistent with this disclosure. In some implementations, memory 1107 can be a combination of two or more different types of memory (for example, a combination of RAM and magnetic storage) according to particular needs, desires, or particular implementations of the computer 1102 and the described functionality. Although illustrated as a single memory 1107 in FIG. 11, two or more memories 1107 (of the same or combination of types) can be used according to particular needs, desires, or particular implementations of the computer 1102 and the described functionality. While memory 1107 is illustrated as an integral component of the computer 1102, in alternative implementations, memory 1107 can be external to the computer 1102.

The application 1108 is an algorithmic software engine providing functionality according to particular needs, desires, or particular implementations of the computer 1102, particularly with respect to functionality described in this disclosure. For example, application 1108 can serve as one or more components, modules, or applications. Further, although illustrated as a single application 1108, the application 1108 may be implemented as multiple applications 1108 on the computer 1102. In addition, although illustrated as integral to the computer 1102, in alternative implementations, the application 1108 can be external to the computer 1102.

The computer 1102 can also include a power supply 1114. The power supply 1114 can include a rechargeable or non-rechargeable battery that can be configured to be either user- or non-user-replaceable. In some implementations, the power supply 1114 can include power-conversion or management circuits (including recharging, standby, or other power management functionality). In some implementations, the power-supply 1114 can include a power plug to allow the computer 1102 to be plugged into a wall socket or other power source to, for example, power the computer 1102 or recharge a rechargeable battery.

There may be any number of computers 1102 associated with, or external to, a computer system containing computer 1102, each computer 1102 communicating over network 1130. Further, the term "client," "user," and other appropriate terminology may be used interchangeably, as appropriate, without departing from the scope of this disclosure. Moreover, this disclosure contemplates that many users may use one computer 1102, or that one user may use multiple computers 1102.

In some implementations, the described methodology can be configured to send messages, instructions, or other communications to a computer-implemented controller, database, or other computer-implemented system to dynamically initiate control of, control, or cause another computer-implemented system to perform a computer-implemented or other function/operation. For example, operations based on data, operations, outputs, or interaction with a GUI can be transmitted to cause operations associated with a computer, database, network, or other computer-based system to perform storage efficiency, data retrieval, or other operations consistent with this disclosure. In another example, interacting with any illustrated GUI (for example, FIGS. 1A-1B, 2A-2B, 3A-3B, 4A-4B, 5A-5D, 6, 7A-7B, and 8-9) can automatically result in one or more instructions transmitted from the GUI to trigger requests for data, storage of data, analysis of data, or other operations consistent with this disclosure.

In some instances, transmitted instructions can result in control, operation, modification, enhancement, or other operations with respect to a tangible, real-world piece of computing or other equipment. For example, the described GUIs can send a request to slow or speed up a computer database magnetic/optical disk drive, shut down/activate a computing system, cause a network interface device to disable, throttle, or increase data bandwidth allowed across a network connection, or sound an audible/visual alarm (such as, a mechanical alarm/light emitting device) as a notification of a result, behavior, determination, or analysis with respect to a computing system(s) associated with the described methodology or interacting with the computing system(s) associated with the described methodology.

In some implementation, the output of the described methodology can be used to dynamically influence, direct, control, influence, or manage tangible, real-world equipment related to hydrocarbon production, analysis, and recovery or for other purposes consistent with this disclosure. For example, real-time data received from an ongoing drilling operation can be incorporated into an analysis performed using the described methodology. Output of the described super-resolution radon transform on seismic data can be used for various purposes. For example, depending on a generated result(s) of the described methodology, a wellbore trajectory can be modified, a drill speed can be increased or reduced, a drill can be stopped, an alarm can be activated/deactivated (such as, visual, auditory, or voice alarms), refinery or pumping operations can be affected (for example, stopped, restarted, accelerated, or reduced). Other examples can include alerting geo-steering and directional drilling staff based on identification of small structures and subtle stratigraphic changes in target horizons (such as, with a visual, auditory, or voice alarm). In some implementations, the described methodology can be integrated as part of a dynamic computer-implemented control system to control, influence, or use with any hydrocarbon-related or other tangible, real-world equipment consistent with this disclosure.

Described implementations of the subject matter can include one or more features, alone or in combination.

For example, in a first implementation of a computer-implemented method, the first implementation includes receiving post-stack seismic data; creating, from the received post-stack seismic data, transformed seismic data, including performing a super-resolution radon transform on the post-stack seismic data; separating, using the transformed seismic data, signal and noise regions, including using a defined muting function to remove unwanted noise; and performing, using the separated signal and noise regions, an inverse radon transform on the separated signal and noise regions, and outputting only signals.

The foregoing and other implementations can each optionally include one or more of the following aspects, alone or in combination:

In a first aspect, combinable with the general implementation and any of the following aspects, creating the transformed seismic data includes: applying a soft thresholding algorithm to the seismic data; subsequently applying a hard thresholding algorithm to the seismic data; repeating the applying of the soft thresholding algorithm and the hard thresholding algorithm until a threshold condition is met; and outputting a super-resolution radon domain.

In a second aspect, combinable with any of the previous or following aspects, the threshold condition is determined according to the formula:

$$\frac{\|d - Lm\|_2}{\|d\|_2} < \epsilon,$$

where d is observed data, L is an inverse linear radon transform, m is a data approximation model, and $\epsilon$ is a predefined small positive number.

In a third aspect, combinable with any of the previous or following aspects, creating the transformed seismic data includes decomposing each complex signal into a set of simple spike-train signals.

In a second implementation of a non-transitory computer-readable medium, the second implementation includes receiving post-stack seismic data; creating, from the received post-stack seismic data, transformed seismic data, including performing a super-resolution radon transform on the post-stack seismic data; separating, using the transformed seismic data, signal and noise regions, including using a defined muting function to remove unwanted noise; and performing, using the separated signal and noise regions, an inverse radon transform on the separated signal and noise regions, and outputting only signals.

The foregoing and other implementations can each optionally include one or more of the following features, alone or in combination:

In a first aspect, combinable with the general implementation and any of the following aspects, creating the transformed seismic data includes: applying a soft thresholding algorithm to the seismic data; subsequently applying a hard thresholding algorithm to the seismic data; repeating the applying of the soft thresholding algorithm and the hard thresholding algorithm until a threshold condition is met; and outputting a super-resolution radon domain.

In a second aspect, combinable with any of the previous or following aspects, the threshold condition is determined according to the formula:

$$\frac{\|d - Lm\|_2}{\|d\|_2} < \epsilon,$$

where d is observed data, L is an inverse linear radon transform, m is a data approximation model, and $\epsilon$ is a predefined small positive number.

In a third aspect, combinable with any of the previous or following aspects, creating the transformed seismic data includes decomposing each complex signal into a set of simple spike-train signals.

In a third implementation of a computer-implemented system, the third implementation includes creating the transformed seismic data includes: applying a soft thresholding algorithm to the seismic data; subsequently applying a hard thresholding algorithm to the seismic data; repeating the applying of the soft thresholding algorithm and the hard thresholding algorithm until a threshold condition is met; and outputting a super-resolution radon domain.

The foregoing and other implementations can each optionally include one or more of the following features, alone or in combination:

In a first aspect, combinable with the general implementation and any of the following aspects, creating the transformed seismic data includes: applying a soft thresholding algorithm to the seismic data; subsequently applying a hard thresholding algorithm to the seismic data; repeating the applying of the soft thresholding algorithm and the hard thresholding algorithm until a threshold condition is met; and outputting a super-resolution radon domain.

In a second aspect, combinable with any of the previous or following aspects, the threshold condition is determined according to the formula:

$$\frac{\|d - Lm\|_2}{\|d\|_2} < \epsilon,$$

where d is observed data, L is an inverse linear radon transform, m is a data approximation model, and $\epsilon$ is a predefined small positive number.

In a third aspect, combinable with any of the previous or following aspects, creating the transformed seismic data includes decomposing each complex signal into a set of simple spike-train signals.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving post-stack seismic data;
   creating, from the received post-stack seismic data, transformed seismic data, including performing a super-resolution radon transform on the post-stack seismic data to decompose each complex signal into a set of simple spike-train signals;
   separating, using the transformed seismic data, signal and noise regions, including using a defined muting function to remove unwanted noise; and
   performing, using the separated signal and noise regions, an inverse radon transform on the separated signal and noise regions;
   wherein creating the transformed seismic data includes:
      applying a soft thresholding algorithm including a forward and a reverse radon transform followed by a shrinking thresholding operator to the seismic data to solve a first norm regularization equation; and
      subsequently applying a hard thresholding algorithm to the seismic data to solve a first norm regularization equation.

2. The computer-implemented method of claim 1, wherein creating the transformed seismic data includes:
   repeating the applying of the soft thresholding algorithm and the hard thresholding algorithm until a threshold condition is met, wherein:
      applying the soft thresholding algorithm to the seismic data provides an estimation on a sparsity level of a solution to the second norm regularization equation; and
      using the estimation to solve the second norm regularization equation; and
   outputting a super-resolution radon domain.

3. The computer-implemented method of claim 2, wherein the threshold condition is determined according to the formula:

$$\frac{\|d - Lm\|_2}{\|d\|_2} < \epsilon,$$

where d is observed data, L is an inverse linear radon transform, m is a data approximation model, and $\epsilon$ is a predefined small positive number.

4. The computer-implemented method of claim 1, wherein the soft thresholding algorithm comprises a fast iterative shrinkage-thresholding algorithm (FISTA).

5. The computer-implemented method of claim 4, wherein the hard thresholding algorithm comprises an iterative hard thresholding algorithm.

6. The computer-implemented method of claim 4, wherein the soft thresholding algorithm comprises dynamically choosing a shrinkage parameter $\mu$.

7. A non-transitory, computer-readable medium storing one or more instructions executable by a computer system to perform operations comprising:
   receiving post-stack seismic data;
   creating, from the received post-stack seismic data, transformed seismic data, including performing a super-resolution radon transform on the post-stack seismic data to decompose each complex signal into a set of simple spike-train signals;
   separating, using the transformed seismic data, signal and noise regions, including using a defined muting function to remove unwanted noise; and
   performing, using the separated signal and noise regions, an inverse radon transform on the separated signal and noise regions;
   wherein creating the transformed seismic data includes:
      applying a soft thresholding algorithm including a forward and a reverse radon transform followed by a shrinking thresholding operator to the seismic data to solve a first norm regularization equation; and
      subsequently applying a hard thresholding algorithm to the seismic data to solve a first norm regularization equation.

8. The non-transitory, computer-readable medium of claim 7, wherein creating the transformed seismic data includes:
   repeating the applying of the soft thresholding algorithm and the hard thresholding algorithm until a threshold condition is met, wherein:
      applying the soft thresholding algorithm to the seismic data provides an estimation on a sparsity level of a solution to the second norm regularization equation; and
      using the estimation to solve the second norm regularization equation; and
   outputting a super-resolution radon domain.

9. The non-transitory, computer-readable medium of claim 8, wherein the threshold condition is determined according to the formula:

$$\frac{\|d - Lm\|_2}{\|d\|_2} < \epsilon,$$

where d is observed data, L is an inverse linear radon transform, m is a data approximation model, and $\epsilon$ is a predefined small positive number.

10. A computer-implemented system, comprising:
a computer memory; and
a hardware processor interoperably coupled with the computer memory and configured to perform operations comprising:
  receiving post-stack seismic data;
  creating, from the received post-stack seismic data, transformed seismic data, including performing a super-resolution radon transform on the post-stack seismic data to decompose each complex signal into a set of simple spike-train signals;
  separating, using the transformed seismic data, signal and noise regions, including using a defined muting function to remove unwanted noise; and
  performing, using the separated signal and noise regions, an inverse radon transform on the separated signal and noise regions;
wherein creating the transformed seismic data includes:
  applying a soft thresholding algorithm including a forward and a reverse radon transform followed by a shrinking thresholding operator to the seismic data to solve a first norm regularization equation; and
  subsequently applying a hard thresholding algorithm to the seismic data to solve a first norm regularization equation.

11. The computer-implemented system of claim 10, wherein creating the transformed seismic data includes:
  repeating the applying of the soft thresholding algorithm and the hard thresholding algorithm until a threshold condition is met, wherein:
    applying the soft thresholding algorithm to the seismic data provides an estimation on a sparsity level of a solution to the second norm regularization equation; and
  using the estimation to solve the second norm regularization equation; and
  outputting a super-resolution radon domain.

12. The computer-implemented system of claim 11, wherein the threshold condition is determined according to the formula:

$$\frac{\|d - Lm\|_2}{\|d\|_2} < \epsilon,$$

where d is observed data, L is an inverse linear radon transform, m is a data approximation model, and $\epsilon$ is a predefined small positive number.

* * * * *